Jan. 22, 1946.  E. S. HINELINE  2,393,534
ELECTRIC-MOTOR-DRIVEN COMBINED CAMERA
FOCAL-PLANE-SHUTTER AND FILM-FEED
Filed Oct. 19, 1943  13 Sheets-Sheet 1

INVENTOR.
Edson S. Hineline
BY
his Attorneys

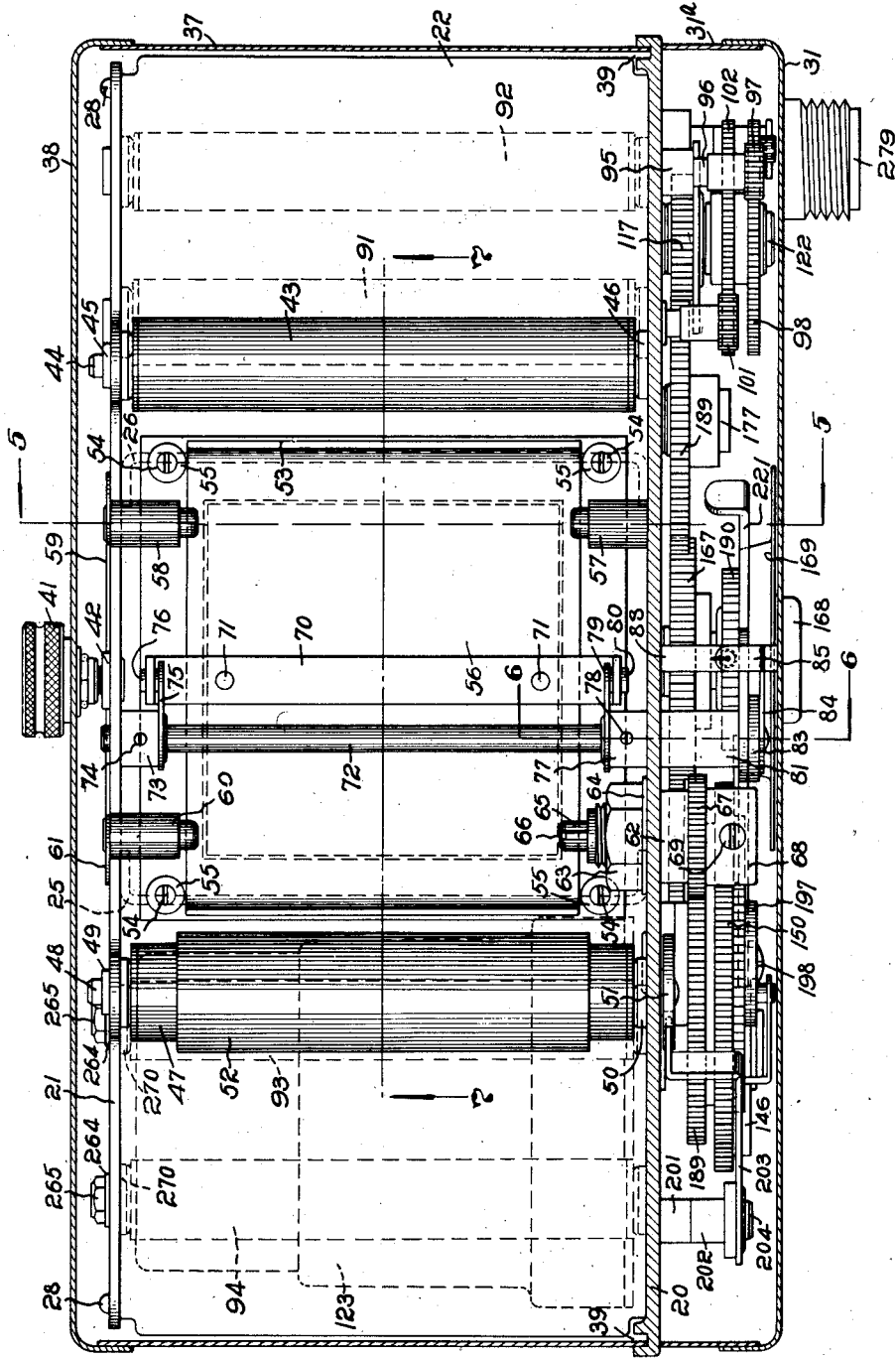

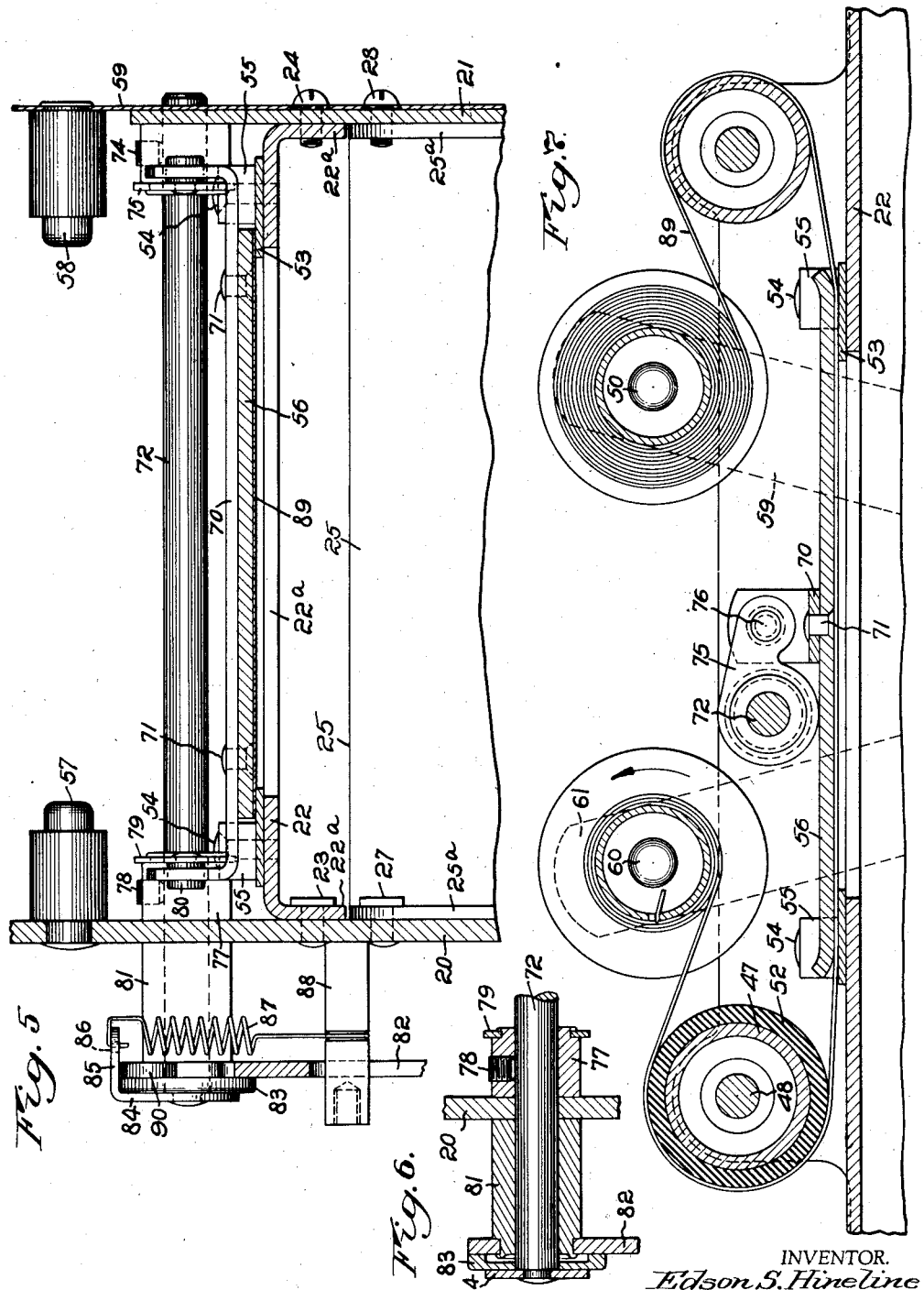

Jan. 22, 1946.  E. S. HINELINE  2,393,534
ELECTRIC-MOTOR-DRIVEN COMBINED CAMERA
FOCAL-PLANE-SHUTTER AND FILM-FEED
Filed Oct. 19, 1943  13 Sheets-Sheet 4
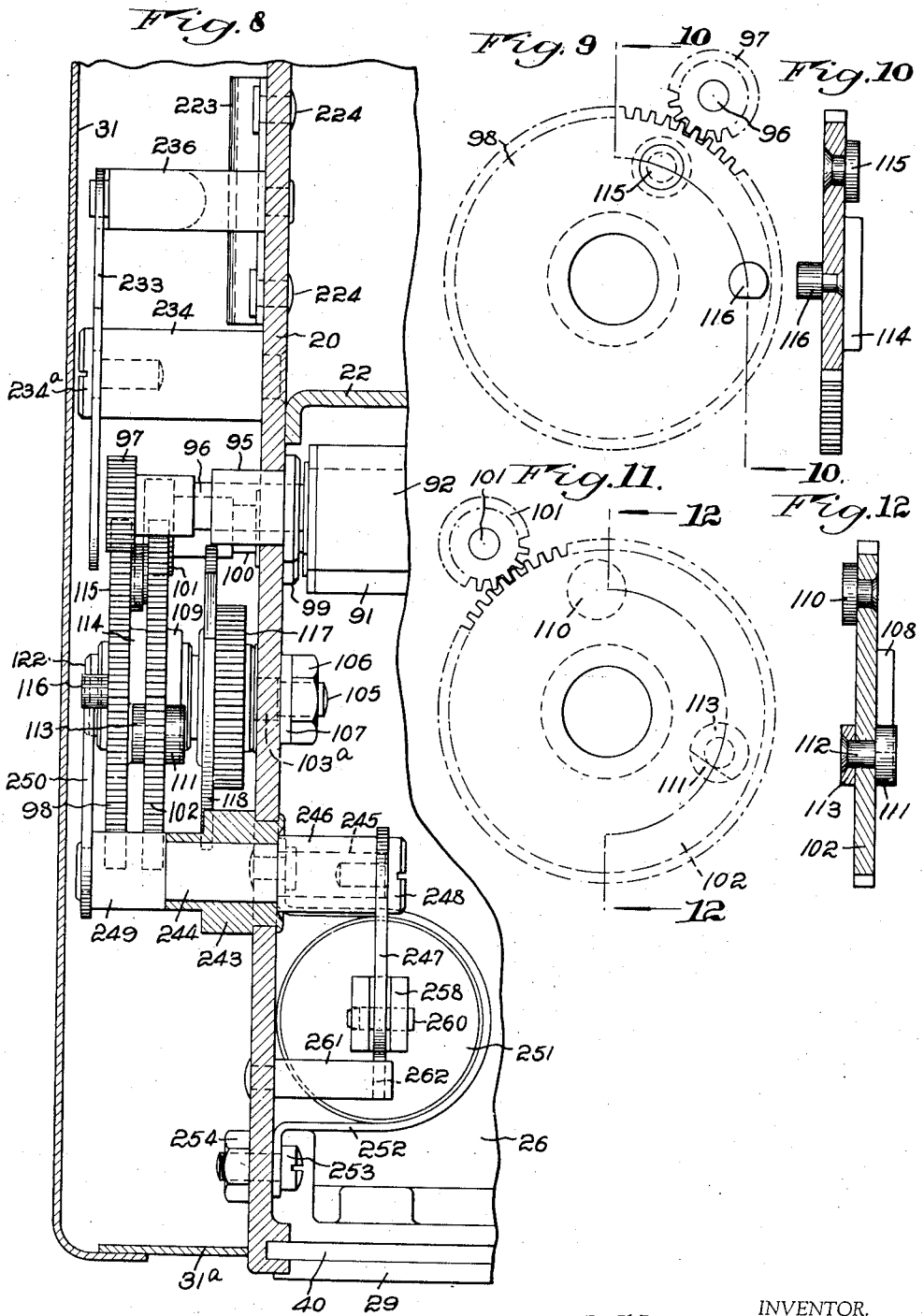
INVENTOR.
Edson S. Hineline
BY
his Attorneys Jan. 22, 1946.

E. S. HINELINE 2,393,534

ELECTRIC-MOTOR-DRIVEN COMBINED CAMERA
FOCAL-PLANE-SHUTTER AND FILM-FEED

Filed Oct. 19, 1943

INVENTOR.
Edson S. Hineline
BY
his Attorneys

Jan. 22, 1946.					E. S. HINELINE						2,393,534
			ELECTRIC-MOTOR-DRIVEN COMBINED CAMERA
			  FOCAL-PLANE-SHUTTER AND FILM-FEED
				Filed Oct. 19, 1943			13 Sheets-Sheet 6
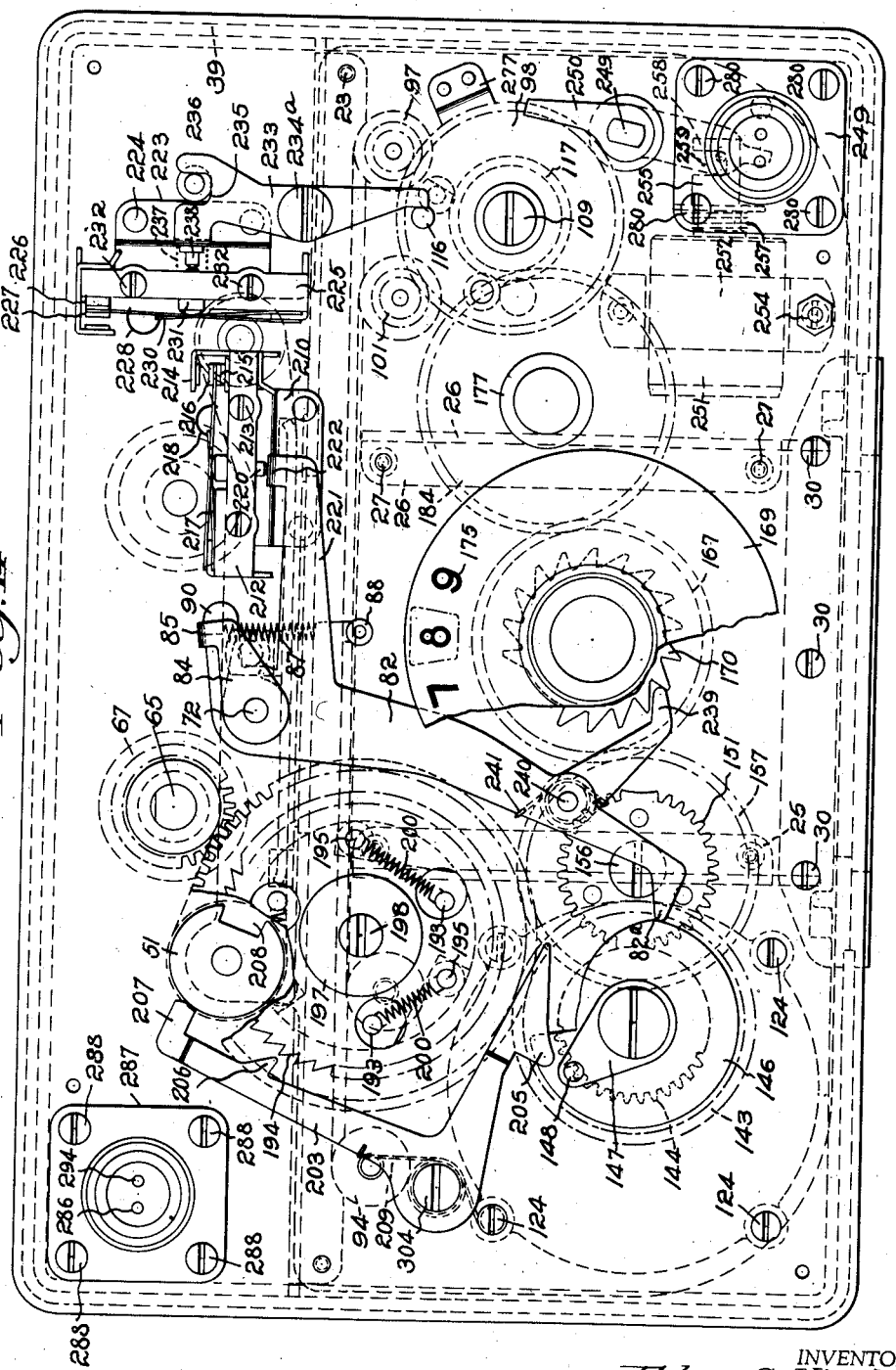
INVENTOR.
Edson S. Hineline
BY
his Attorneys

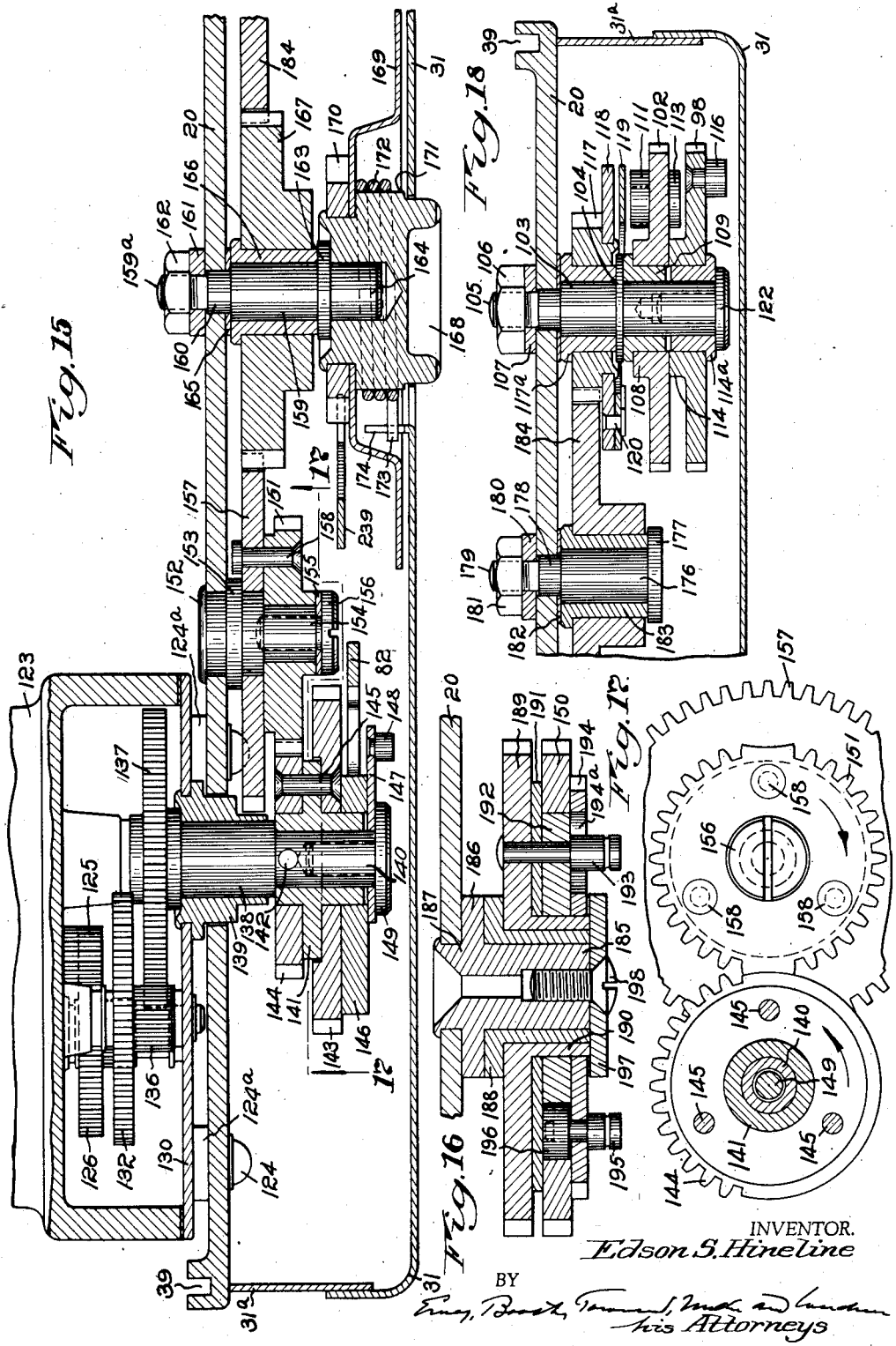

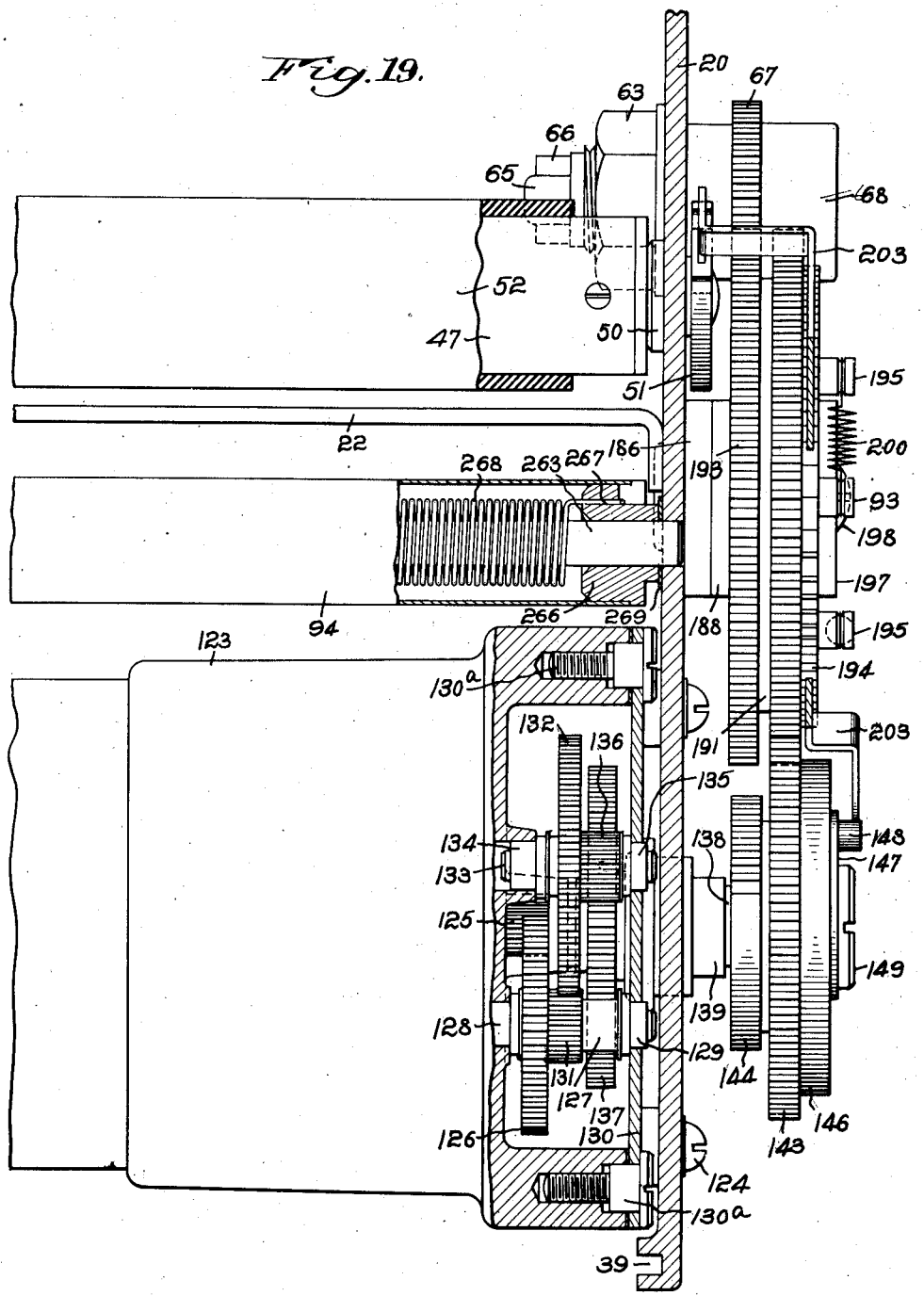

Jan. 22, 1946.　　　　E. S. HINELINE　　　　2,393,534
ELECTRIC-MOTOR-DRIVEN COMBINED CAMERA
FOCAL-PLANE-SHUTTER AND FILM-FEED
Filed Oct. 19, 1943　　　13 Sheets-Sheet 9
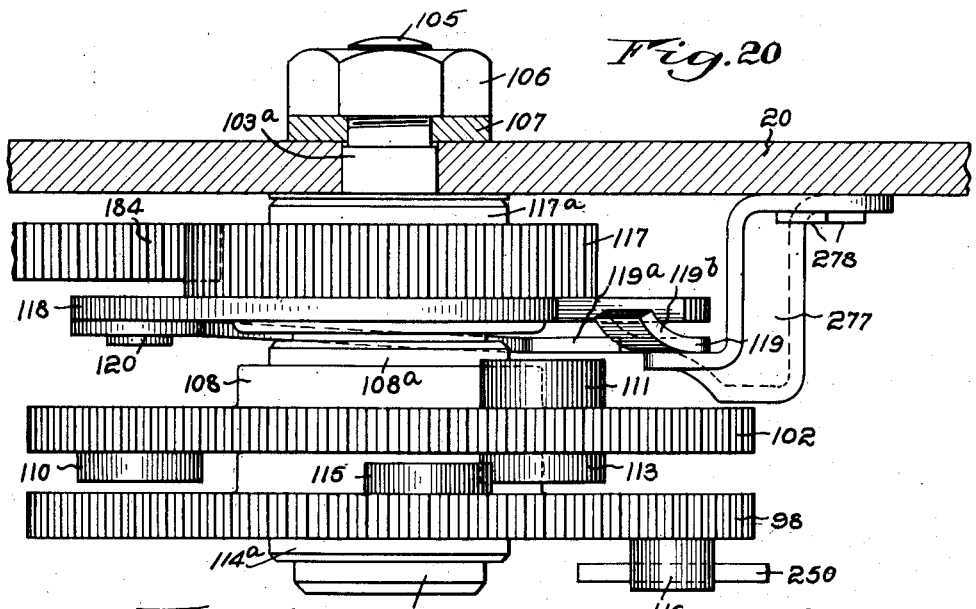
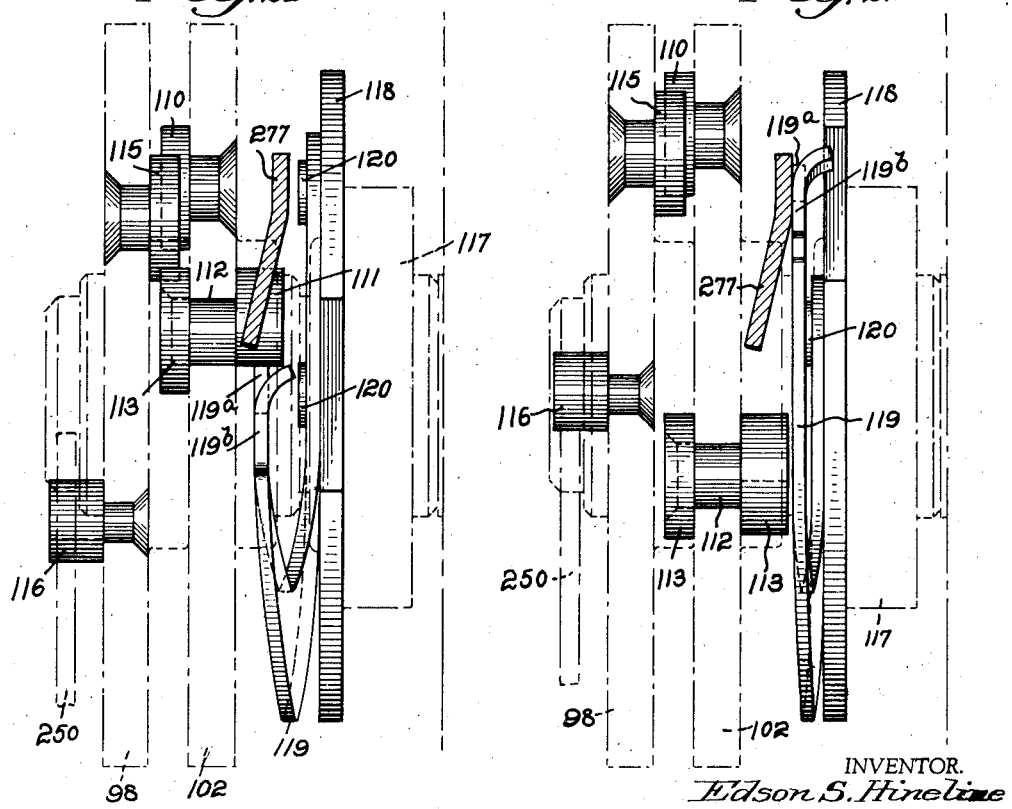
INVENTOR.
Edson S. Hineline
BY
his Attorneys Jan. 22, 1946.  E. S. HINELINE  2,393,534
ELECTRIC-MOTOR-DRIVEN COMBINED CAMERA
FOCAL-PLANE-SHUTTER AND FILM-FEED
Filed Oct. 19, 1943   13 Sheets-Sheet 10
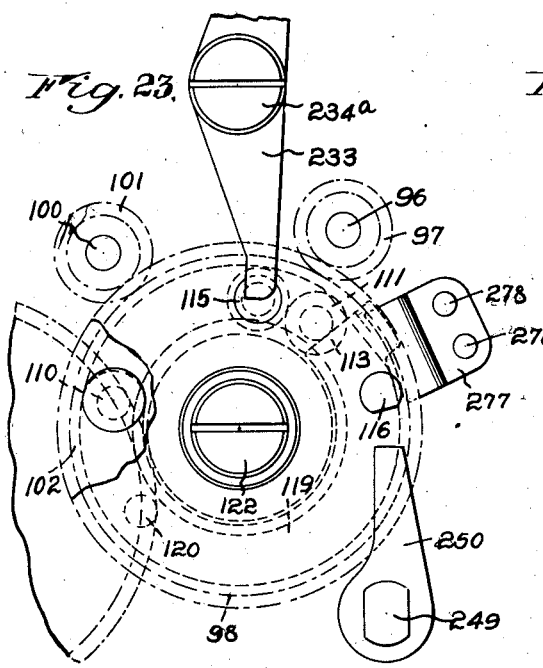
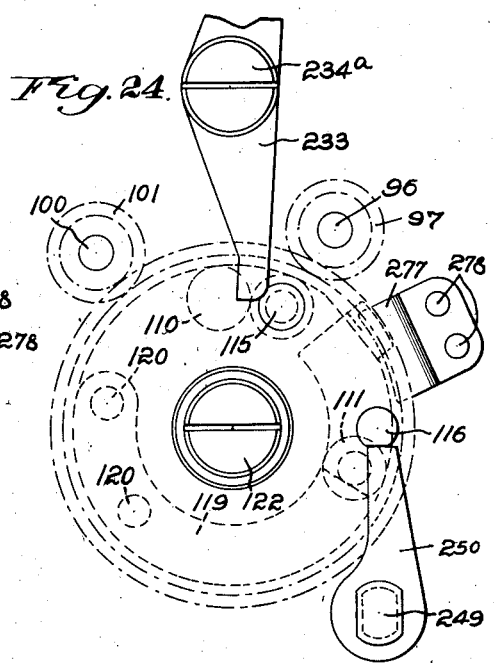
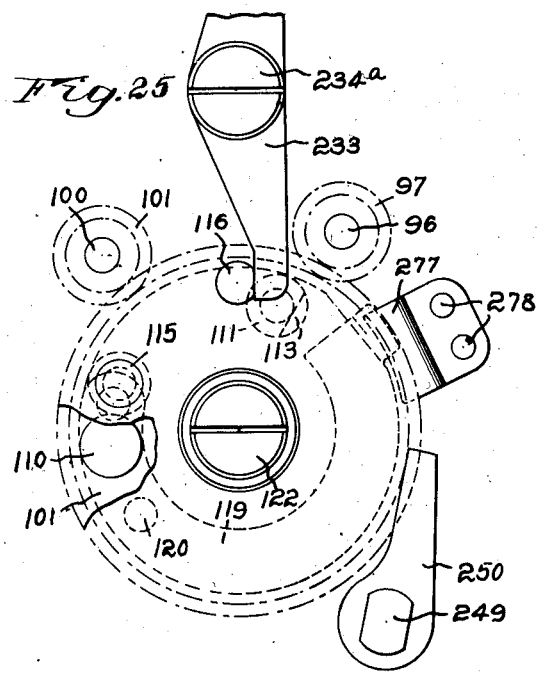
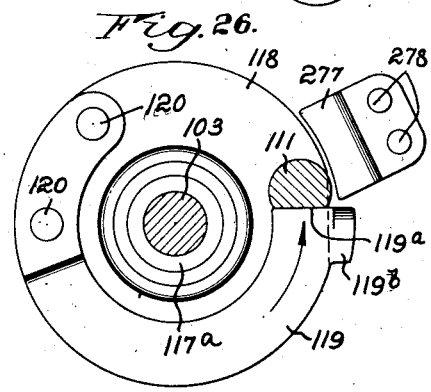
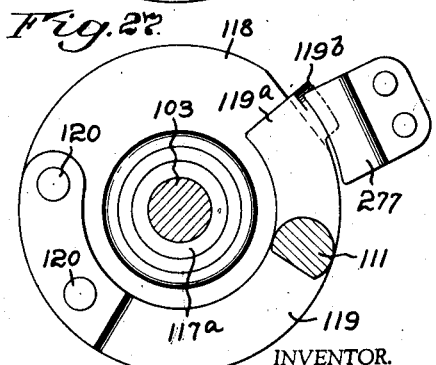
INVENTOR.
Edson S. Hineline
BY
his Attorneys

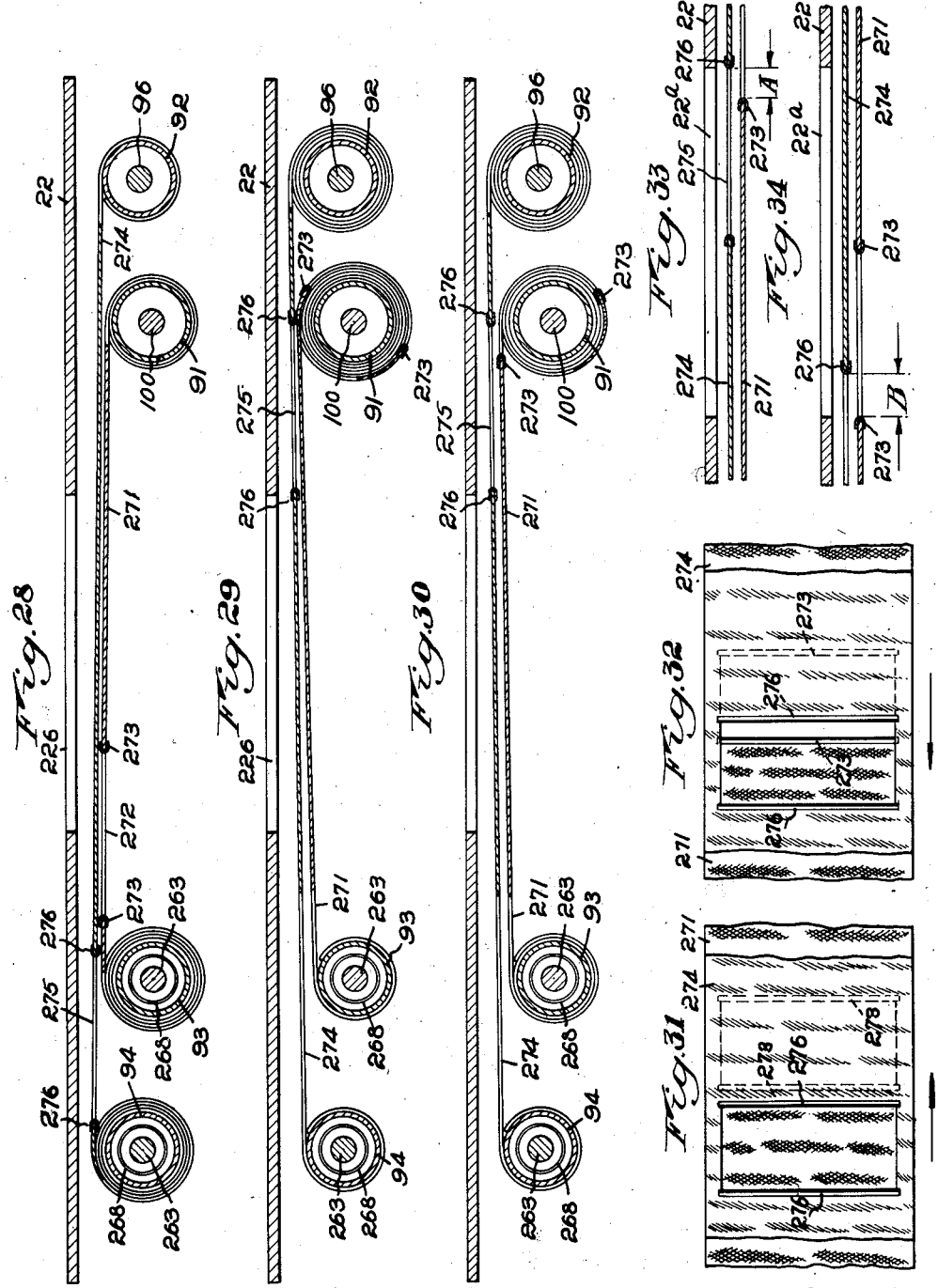

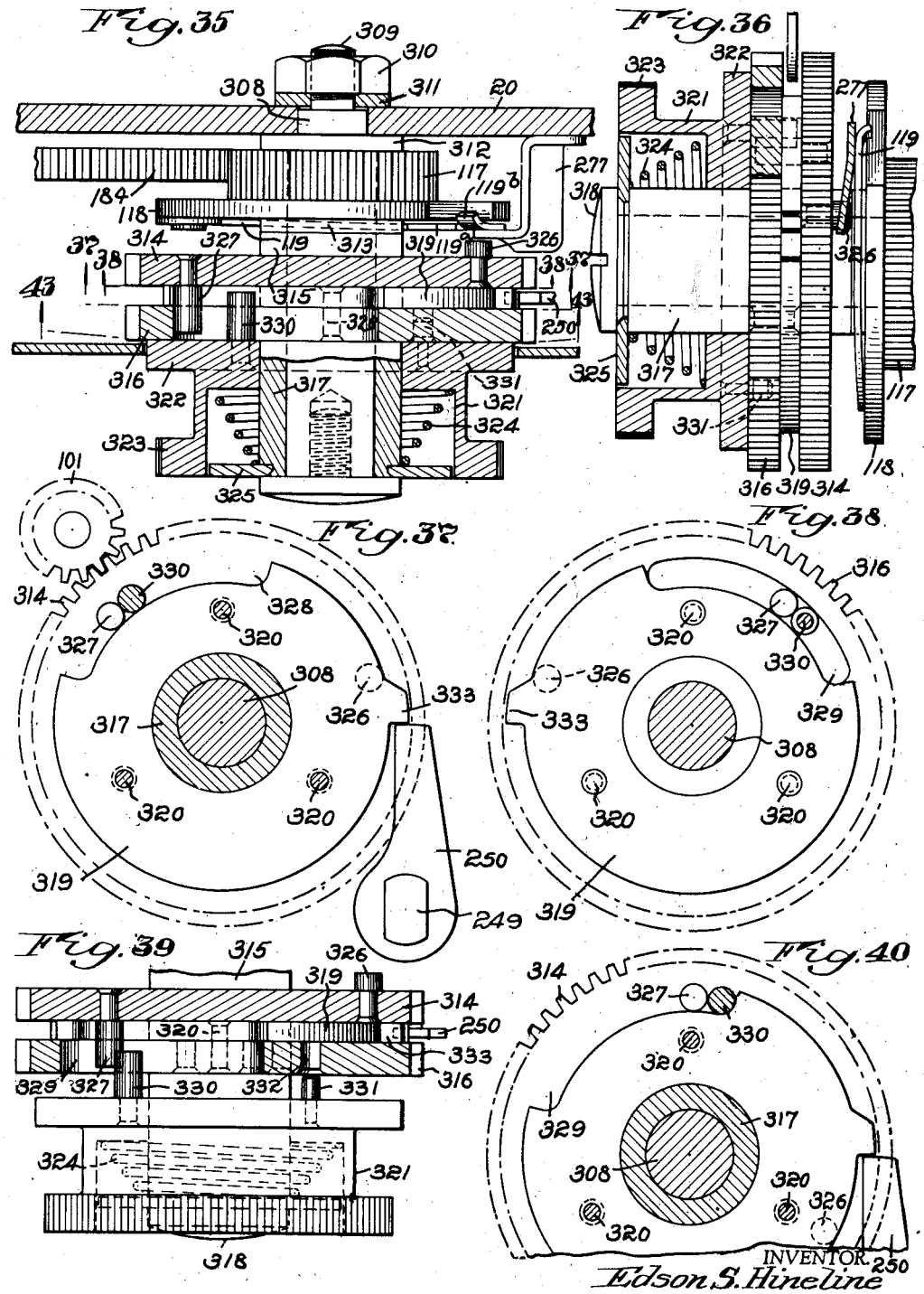

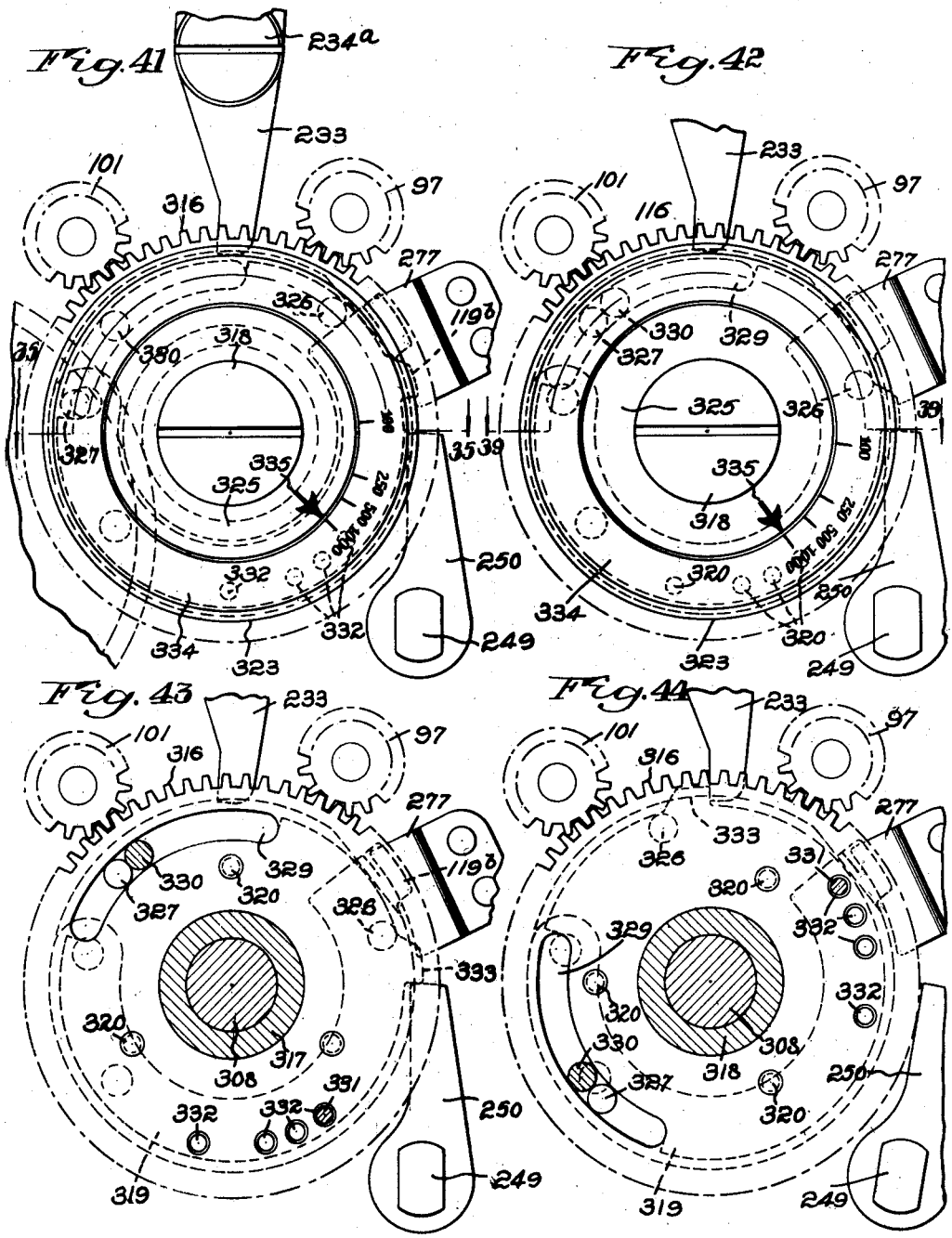

Patented Jan. 22, 1946

2,393,534

UNITED STATES PATENT OFFICE 2,393,534

ELECTRIC-MOTOR-DRIVEN COMBINED CAMERA FOCAL-PLANE SHUTTER AND FILM FEED

Edson S. Hineline, Rochester, N. Y., assignor to Graflex, Inc., Rochester, N. Y., a corporation of Delaware Application October 19, 1943, Serial No. 506,848

46 Claims. (Cl. 95—31)

This invention relates to photographic cameras, particularly of the automatic aerial type, but adapted for various uses.

In order that the principle of the invention may be readily understood, I have disclosed a single embodiment thereof in the accompanying drawings, wherein—

Fig. 1 is a front elevation of the camera having the "cone" partly broken away to show clearly the mounting of the lens barrel;

Fig. 2 is an enlarged fragmentary view corresponding to a part of Fig. 1, and also showing the shutter setting knob provided when the camera is equipped with a shutter having a number of different exposure aperture settings;

Fig. 3 is the wiring diagram of the camera, showing a battery as a current supply source and a switch for closing the circuit to operate the camera;

Fig. 4 is a top plan view of the camera with part of the housing in horizontal section so as to show the position of the pressure pad, the idler roll, the film measuring roll, the film spool support and the drive mechanism;

Fig. 5 is a partial vertical section through the camera on the line 5—5, Fig. 4;

Fig. 6 is an enlarged detail in longitudinal section of a portion of Fig. 5 on the line 6—6, Fig. 4, showing the construction of a part of the pressure pad operating mechanism;

Fig. 7 is a vertical longitudinal section through Fig. 4 on the line 7—7 thereof, showing the position of the film spools and the path traveled by the film across the exposure aperture and under the pressure pad;

Fig. 8 is a partial vertical section through the camera, taken at the right of the curtain rewind rolls as viewed in Fig. 4, and showing the curtain rewind mechanism and the shutter release solenoid;

Fig. 9 is a detail showing in side elevation the second curtain rewind gear and the second curtain pinion;

Fig. 10 is a vertical section through Fig. 9 on the line 10—10 thereof, showing the curtain latch stud and the second curtain driving stud;

Fig. 11 is a detail in side elevation, showing the first curtain rewind gear and the first curtain pinion;

Fig. 12 is a vertical section through Fig. 11 on the line 12—12 thereof, showing the shutter rewind stud and the second curtain driving stud;

Figure 13:
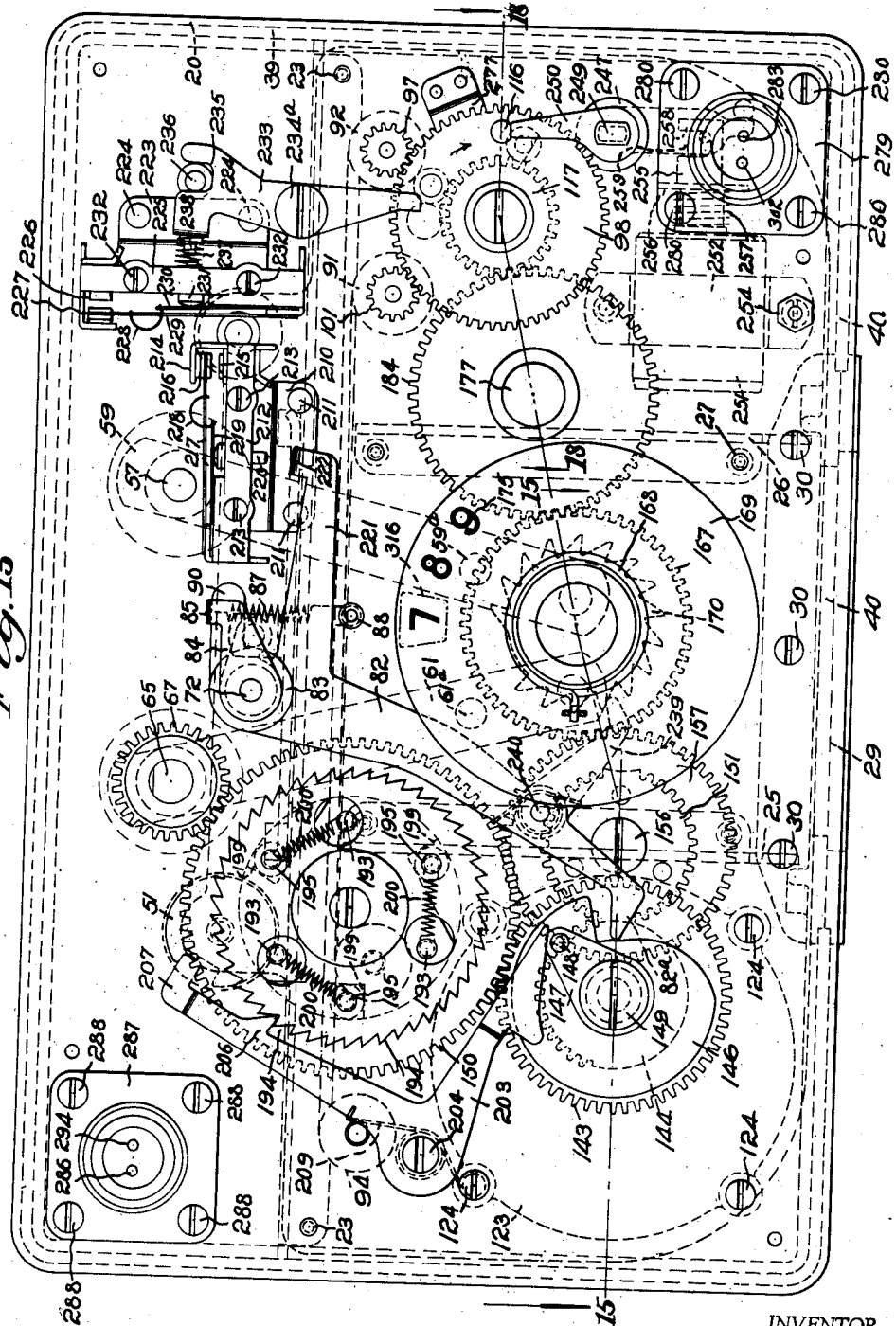

Fig. 13 is a front elevation of the camera with the lens "cone" and the mechanism housing cover removed to show the cycling mechanism, the film feed clutch, the exposure counter, the shutter rewind mechanism, the switches for controlling the cycling mechanism and shutter release, and the receptacles for power supply and remote control, the entire mechanism being shown in its condition when the shutter has been rewound and a new area of film has been fed into position over the exposure opening and the camera is ready for making an exposure;

Fig. 14 is a front elevation similar to Fig. 13 but with a different position of the parts, the circuit having been closed to the shutter release solenoid, the shutter curtain having run all the way down, thus completing a circuit to the motor, and the motor having started to operate, thus lifting the pressure pad and releasing the film measuring mechanism, the film being wound to the next exposure position and the shutter being rewound for the next exposure;

Fig. 15 is a partial horizontal section on an enlarged scale through Fig. 13 on the line 15—15 thereof, showing the motor gear drive and its association with the cycling mechanism or interrupted gears, the idler gear constituting the counter gear, and the counter dial;

Fig. 16 is a detail in horizontal section through the film measuring clutch;

Fig. 17 is a detail in side elevation of the interrupted gears;

Fig. 18 is a horizontal section through Fig. 13 on the line 18—18 thereof, showing the shutter rewind mechanism;

Fig. 19 is a fragmentary left-hand end view of the camera viewing Fig. 13, with parts broken away more clearly to show the construction;

Fig. 20 is a horizontal section through the shutter rewind mechanism, showing the shutter rewind driving pawl, the shutter being completely rewound and the driving pawl disengaged from the shutter rewind stud;

Fig. 21 is a side elevation of the parts shown in Fig. 20, certain parts being represented in broken lines to show more clearly the construction of the shutter rewind driving mechanism, represented as in condition for rewinding the shutter, the driving pawl not yet having been released;

Fig. 22 is a view similar to Fig. 21, but representing the driving pawl as released from the driving stud of the first curtain gear;

Fig. 23 is a detail of the shutter rewind mechanism, the shutter being rewound but the rewind pawl not yet released.

Fig. 24 is a view similar to Fig. 23, the rewind pawl having been released and the second curtain release stud engaged by the shutter release member;

Fig. 25 is a view similar to Fig. 24, the shutter having been released and run all the way down;

Fig. 26 is a detail of the shutter winding mechanism with certain of the parts removed to show the construction of the rewind pawl, the rewind stud being shown in section, and the rewind pawl being about to be engaged by the pawl release cam;

Fig. 27 is a view similar to Fig. 26, the rewind pawl having been acted upon by the release cam;

Fig. 28 is a section through the curtain rollers, the curtain and the exposure plate lengthwise the latter, the curtain being shown in the rundown and capped condition;

Fig. 29 is a view similar to Fig. 28, the curtain having been rewound and the exposure slot or aperture thereof not yet established;

Fig. 30 is a view similar to Fig. 28, showing the curtain exposure slot or aperture established and the curtain in condition for making an exposure;

Fig. 31 is a broken-away detail in top plan view of the curtain when in the condition shown in Fig. 28;

Fig. 32 is a similar top plan view of the curtain in the condition shown in Fig. 30;

Fig. 33 is a longitudinal section through the curtain showing the exposure slot or aperture, the curtain having just started to run down or across the exposure opening;

Fig. 34 is a section similar to Fig. 33, the curtain having run down and the exposure slot or aperture represented as having a greater dimension than the exposure slot or aperture shown in Fig. 33;

Fig. 35 is a horizontal section on the line 35—35 of Fig. 41 through the shutter rewind mechanism equipped with means for varying the curtain aperture;

Fig. 36 is a vertical section through the shutter rewind mechanism, the first curtain driving stud having been released from the curtain rewind pawl;

Fig. 37 is a horizontal section through Fig. 36 on the line 37—37 thereof;

Fig. 38 is a horizontal section through Fig. 35 on the line 38—38 thereof, but showing the shutter set for a different speed and with the exposure slot or aperture established;

Fig. 39 is a horizontal section through Fig. 42 on the line 39—39 thereof;

Fig. 40 is a view partly broken away, but similar to Fig. 37, the shutter having been set for a different exposure slot or aperture;

Fig. 41 is a front elevation of the shutter rewind mechanism having incorporated the shutter setting knob, the shutter being set for a speed of $1/1000$ of a second, the mechanism being shown with the shutter in the act of being rewound and the driving pawl not yet released;

Fig. 42 is a view similar to Fig. 41, the driving pawl having been released, establishing the exposure slot or aperture in the shutter of a width providing for an exposure of $1/1000$ of a second;

Fig. 43 is a view similar to Fig. 42, the shutter setting knob having been removed to show more clearly the construction of the shutter rewind mechanism; and Fig. 44 is a view similar to Fig. 43, but with the shutter mechanism in a run-down condition.

This invention relates to a new photographic camera that is adapted to many uses, among them the photographing of flight instruments in an airplane in flight, or instruments used in running various tests, such as manometers, and for almost any purpose requiring a self-contained camera that makes an exposure upon the closing of an electric circuit and then automatically restores itself for a second exposure. The camera is also especially adapted for use as an aerial camera particularly when used for certain classes of work such as photographing the smoke given off by a bomb when it explodes upon hitting the ground. The camera can also be use for regular aerial photographic work. It is perfectly adapted for uses involving setting up a camera in a permanent installation so as to make photographs at predetermined intervals, the electrical circuit being closed by means of a timeclock or any other suitable device. Since the camera is so constructed that lenses of almost any focal length can be used, the camera need not be close to the object being photographed. Another use for which this camera is perfectly adapted is for photographing games, such as baseball games, wherein several of such cameras will be mounted and directed at certain spots, such as the various bases, the pitcher's box, or any other desired area, so that one operator can control any one of the cameras at the proper instant by pushing a button and closing an electrical circuit. Such uses will serve to point out the versatility of this camera.

Among the numerous objects of this invention are: to provide a camera of comparatively simple, sturdy construction, thus making it possible to manufacture it in large quantities at a very low cost, and one that is foolproof in operation; to provide a camera having a drive motor built within the body of the camera; to provide a camera especially adapted for remote control; to provide a camera having an automatic cycling means that is controlled by the operation of the camera shutter itself, so that after each operation of the shutter the camera is automatically restored to condition for a second exposure; to provide a camera having improved film feed means; to provide a camera having an automatic control for the pressure pad that is held in contact with the sensitized material by resilient spring means, which pressure pad is removed from contact with the sensitized material at the commencement of the rewind cycle; to provide a camera having a self-capping focal-plane shutter of a variable exposure aperture type and having means for controlling the width of the opening of such exposure aperture during the time the curtain travels in a picture-making direction; and to provide a camera having a simple curtain rewind and film feed mechanism that can be easily serviced in the field.

This invention is more particularly directed to the shutter mechanism, and to the film feed interrelated therewith, and to the automatic cycling means driven by an electric motor and controlled by the operation of the shutter itself, so that after each operation of the shutter the camera is automatically reset. Before proceeding to describe these and other important features, I will describe in detail the general structure of the camera body and for that purpose will refer first to Figs. 1, 2, 4, 5, 6 and 7, wherein is shown the preferred form of structure for this purpose.

The camera body, as shown in Figs. 1, 2, 4 and 5, and in part in Figs. 7 and 8, is made up mainly of two parallel spaced plates, one of which is termed the mechanism plate and is indicated in section in Fig. 4 and elsewhere at 20. Parallel therewith and spaced therefrom by nearly the width of the camera is the other or so-called outer plate 21, and supported between said plates 20 and 21, normal thereto, is a central channel member 22, shown in plan in Fig. 4 and in transverse section in Fig. 5, and in longitudinal section in Fig. 7. The said member 22 is attached to mechanism plate 20 by rivets 23, and to the outer plate 21 by screws 24.

Positioned between said plates 20, 21 are partitions 25 and 26, the former being best shown in Fig. 5, and both being indicated in dotted lines in Fig. 4. Both partitions 25, 26 are of channel form, and are attached to the mechanism plate 20 (as shown in Fig. 5) by rivets 27 passing through upturned edges, and to the outer plate 21 by screws 28 passing through said upturned edges indicated at 25a in Fig. 5. Also positioned between the mechanism plate 20 and the outer plate 21 is a "cone" support casting of any suitable shape (indicated in dotted lines at 29 in Figs. 13 and 14 and in solid lines in Fig. 8), which is attached to the mechanism plate 20 by screws 30, 30, and to the outer plate 21 by screws or in other suitable manner not herein indicated.

Attached to the mechanism plate 20 is a mechanism housing cover 31 by screws 32, 32, as shown in Fig. 1, and the lens "cone" (indicated generally at 33) is attached to the "cone" support casting 29 by screws 34, 34. The said lens "cone" 33 is provided with a bushing 35 into which is threaded the lens barrel 36 of any suitable type and structure.

Enclosing the entire camera is a cover of general rectangular shape made up of two parts 37, 38, completely enclosing the camera parts between the plates 20, 21 (best indicated in Fig. 4). The mechanism plate 20 is provided with a groove 39 into which the cover member 37 is fitted and the lens "cone" casting 29 is provided with a similar groove 40 indicated in dotted lines in Figs. 13 and 14 and in solid lines in Fig. 8. The structure is thus completely light-tight. The said cover consisting of the two cover members 37, 38 is provided with a clamp nut 41 (best shown in Fig. 4) threaded onto a stud 42 attached to the outer plate 21, thus providing means for securely holding the camera cover in the camera body.

In Fig. 4 is represented a film idler roll 43 provided with a shaft 44 free to turn in a bushing 45 mounted in the outer plate 21 and in a bushing 46 mounted on the mechanism plate 20. Also mounted between the mechanism plate 20 and the outer plate 21 is a measuring roll 47 having a shaft 48, one end whereof passes through a bushing 49 in said outer plate 21. The opposite end of the shaft 48 passes through a bushing 50 and the mechanism plate 20. To the outer right-hand or lower end of the shaft 48 (viewing Fig. 4) is attached a measuring cam 51, more fully described subsequently. Fitted over the measuring roll 47, as shown in Figs. 4 and 7, is a rubber cylinder or sleeve 52 so as to provide sufficient friction between said measuring roll 47 and the sensitized film material, accurately to measure off the proper amount of film as it passes around the measuring roll 47.

Attached to the central channel member 22, as best shown in Figs. 4, 5 and 7, is an aperture plate 53 by means of screws 54, 54 passing through bushings 55, 55 and threaded into the central channel member 22. Said bushings 55, 55 serve to guide the film through the camera and also properly to position the pressure plate or pad 56.

As best shown in Fig. 5, to the mechanism plate 20 is attached a film support stud 57, and to the outer plate 21 is attached a second film support stud 58, not mounted directly on the outer plate 21 but carried by a spring member 59 carried by said plate 21. Also attached to the outer plate 21 is a second film spool support stud 60 by means of a spring 61. The springs 59 and 61 are most clearly shown in Figs. 4 and 5, and are also shown in dotted lines in Fig. 7. They are riveted to the outer plate 21 in any suitable manner, and in Fig. 13 rivets 59a and 61a are represented for this purpose.

As shown in Fig. 4, to the mechanism plate 20 is attached a bushing 62 held to said mechanism plate 20 by nut 63 and washer 64. Passing through the bushing 62 is a shaft 65 having the usual film spool driving dog 66. To the opposite end of the shaft 65, as shown in Fig. 13, is a film feed gear 67 provided with a hub 68 and a lock screw 69. The said film feed gear and its function will be more fully referred to subsequently.

Referring to Figs. 4, 5, 6 and 7, the pressure plate or pad 56 is provided with a hinge member 70 attached thereto by rivets 71, 71. Passing through the mechanism plate 20 and the outer plate 21 is a shaft 72, and mounted thereon is a hub 73, shown in Fig. 4 as locked to the shaft 72 by a lock screw 74. Attached to the shaft 72, as to the hub 73 thereof, in any well known manner, is an arm 75 provided with a pin 76 engaging a hole in the hinge member 70. On the opposite end of the shaft 72 adjacent to the mechanism plate 20 is a second hub 77 having a lock screw 78, as best shown in Figs. 6 and 7. The hub 77 is also provided with an arm 79 and a pin 80, the latter engaging a second hole in the hinge member 70.

Fitted to the right-hand end of the shaft 72, viewing Fig. 4, and the left-hand end, viewing Fig. 5, and to the left of the mechanism plate 20, viewing Fig. 5, is a hub 81 having attached thereto a bell crank 82, shown most clearly in Figs. 6 and 13. Free to turn on the shaft 72 is a washer 83 separating the pressure pad operating arm 84 that is riveted to the shaft 72, as shown in Figs. 5 and 6. As there indicated, and also in Fig. 13, said pressure pad operating arm 84 is provided with an L-shaped end 85 provided with a hole 86 into which is hooked the spring 89, the opposite end whereof is anchored to the spring support rod 88, as shown most clearly in Figs. 5, 13 and 14. Inasmuch as the pressure pad operating arm 84 is securely attached to the shaft 72, when the pressure pad operating arm 84 is turned in a counterclockwise direction, viewing Figs. 13 and 14, the pressure plate or pad 56 will be caused to be lifted from the sensitized material 89, and when released the shaft 72 will be caused to turn in a clockwise direction, thus applying pressure to the sensitized material 89 through the tension of spring 87. The said bell crank 82 is provided with a second arm 90 that engages the L-shaped or turned-over end 85 of the pressure pad operating arm 84. Thus any movement of the bell crank 82 in a contraclockwise direction will cause the shaft 72 also to be turned in a contraclockwise direction.

The structure thus far referred to is that pertaining to or constituting the general structure of the camera, excepting that structure relating to the pressure plate or pad mechanism. My invention is not limited to a camera of the specific structure thus far described, which has been set forth merely as one embodiment of means for supporting those portions of the photographic mechanism to which my invention more particularly applies.

*The shutter mechanism.*—I will next describe the shutter mechanism, which is motor driven by an electric motor within the camera body, and which shutter is preferably of the two-curtain focal-plane shutter type providing, if desired, a variable aperture, and which shutter is self-capping while being wound. In cooperation with the shutter there is provided automatic cycling means controlled by the operation of the shutter itself, so that after each operation the camera is ready for the next operation.

I will describe without limiting myself thereto the specific construction provided for this purpose, and in so doing I will refer particularly to Fig. 4 and Figs. 8 to 13 and 19.

The camera is provided with a first curtain take-up roller 91, shown in solid lines in Fig. 8 and in dotted lines in Fig. 4, and with a second-curtain take-up roller 92 similarly shown in said figures. Each of said curtains is provided with the usual tension roller, the first curtain tension roller being indicated at 93, in dotted lines in Fig. 4, and the second curtain tension roller 94 in Figs. 4 and 19. They are also shown in the subsequently referred to views Figs. 28 to 30.

In Fig. 8, indicating certain of the parts in vertical section and showing many of the parts that are fitted to the mechanism plate 20, there is shown therein a bushing 95 through which passes the shaft 96 of the second curtain take-up roller 92, to which shaft is attached in any suitable manner a pinion 97 meshing with the second curtain rewind gear 98. Also fitted to the said mechanism plate 20 is another bushing 99 through which passes the shaft 100 of the said first curtain take-up roller 91, and to the left-hand end of said shaft 100 is attached the first curtain pinion 101 meshing with the first curtain rewind gear 102, which with the second curtain rewind gear 98 are carried on a stud shaft or stud 103, best indicated in Figs. 8, 18 and 20. The said shaft or stud 103 is provided with a separating collar 104 and has a reduced diameter 103a and a threaded end portion 105. The said shaft or stud passes through the said mechanism plate 20 and is securely held thereto by nut 106 and lock washer 107.

The second curtain rewind gear 98 and the first curtain rewind gear 102, as most clearly shown in Figs. 8, 18 and 20, are mounted on said shaft 103. The said first curtain rewind gear 102 is provided with a hub 108, a bushing 109, a second curtain drive stud 110 and a first curtain drive stud 111. The said second curtain drive stud 110 is shown in Fig. 12 as riveted to the said first curtain rewind gear 102. The said first curtain drive stud 111 has a neck portion 112 passing through the first curtain rewind gear 102 and through a collar 113, and is riveted as shown in said Fig. 12. The said collar 113 forms driving means for driving the said second curtain rewind gear 98, which is also provided with a hub 114 and a bushing 114a. As shown most clearly in Fig. 10, a second curtain rewind gear driving stud 115 is attached to the second curtain rewind gear 98 by riveting or otherwise, and in the same manner shutter release stud 116 is also attached. Also fitted to the said shaft 103 is a main shutter gear 117 having a bushing 117a and attached to said latter gear is a driving plate 118, shown upon a larger scale in Figs. 20, 21 and 22, and to which is attached, as shown in Fig. 18, the film rewind clutch member 119 by means of rivets 120. The said second curtain rewind gear 98, the first curtain rewind gear 102 and the main shutter rewind gear 117 are, as stated, all carried on the shaft 103, being held thereto by a large head screw 122.

I will now describe in detail the electric motor drive for the shutter, and will refer to Figs. 13, 14 and 15, and more particularly to Fig. 19.

I preferably provide an electric motor of a conventional type procurable on the open market, but having a speed reducing transmission built thereon. Such a motor is diagrammatically indicated at 123 as attached to the inner face of the mechanism plate 20 by screws 124, 124. As shown in Fig. 19, a pinion 125 is attached directly to the motor armature shaft and meshes with an intermediate gear 126 carried on a shaft 127, running in bushings 128 in one wall of the gear housing, and in a bushing 129 in the gear cover plate 130, which is itself attached to the motor housing by shoulder screws 130a, 130a. Also mounted on the said shaft 127 is a pinion 131 meshing with a second intermediate gear 132 carried on a shaft 133 which runs in a bushing 134 fitted to one wall of the gear housing and in a second bushing 135 fitted to the gear housing cover plate 130. Also mounted on the shaft 133 is a pinion 136 that meshes with a drive gear 137 attached to the main drive shaft 138, being fitted into a bushing 139 and passing through the mechanism plate 20 and securely attached to the gear housing cover plate 130.

Still referring particularly to Figs. 13, 14, 15 and 19, the shaft 138 is provided with a reduced diameter 140, to which is fitted a hub 141 keyed thereto by pin 142. Attached to the hub 141 is a film feed drive gear 143 and an interrupted gear 144, also shown in Fig. 17. The said gears 143 and 144 are attached to the hub member 141 by through rivets 145, 145, and fitted to said hub 141 is a cam plate 146, while fitted over the reduced diameter 140 of the shaft 138 is a crank member 147 provided with a pin 148. The crank member 147, cam plate 146 and hub member 141 are all securely attached to the shaft 138 by a large head screw 149, said hub member 141 being keyed to the shaft 138, so that its position with respect to that shaft is fixed.

As shown most particularly in Figs. 13, 14, 15, the cam plate 146 and the crank member 147 can be adjusted circumferentially with respect to the shaft 138 by loosening the screw 149, and when the proper position is found, they are securely clamped in place by said screw 149. The said film feed drive gear 143 meshes with the film feed clutch gear 150 (Fig. 16), and the interrupted gear 144 co-acts with a second interrupted gear 151, best shown in Fig. 17, so as to provide an interrupted motion to the shutter rewind mechanism.

Still referring to Fig. 15, fitted to the mechanism plate 20 and securely anchored thereto, is a stud 152 having an enlarged diameter or shoulder 153, a reduced diameter 154, a washer 155, and a large head screw 156. The said interrupted gear 151 is fitted to the reduced diameter 154 of said stud 152, and is free to rotate thereon. Attached to the interrupted gear 151 is a drive gear 157 by means of rivets 158, and said drive gear 157 is caused to be rotated intermittently through the gears 151 and 144, the said gear 144 being driven by the said electric motor 123.

Referring particularly to Figs. 13, 14 and 15, to the mechanism plate 20 is fitted a stud 159 having a reduced diameter 160 passing through said mechanism plate 20 and locked thereto by washer 161 and nut 162 threaded to the threaded projection 159a of the said stud 159, which is provided with an enlarged diameter forming a collar 163. The said stud 159 extends outward sufficiently far to provide a bearing for a dial for counting the number of exposures upon the film, and which dial will be described in detail subsequently.

In Fig. 15 is represented at 164 an extension of the stud 159. Fitted over said stud 159 at its inner end is a washer 165, and free to rotate on said stud 159 is a bushing 166 which has a press fit in an idler gear 167. Upon the extension 164 of the stud 159 is fitted a knob 168, shown in Figs. 13, 14 and 15, and to which is attached a counter dial 169 of saucer-like formation, and a ratchet wheel 170, both securely held to the knob 168, as best shown in Fig. 15. The knob 168 is provided with a shoulder 171 and is held on the extension 164 of the stud 159 by means of the mechanism cover 31, which, as shown, has a suitable hole through which passes the reduced diameter of said knob 168. Fitted upon the said knob 168, as best shown in Fig. 15, is a coiled spring 172 having an outwardly extending end 173 engaged by a turned-in slotted portion 174 of the said cover 31. The said counter-dial 169 is provided with a series of numbers 175, shown in Figs. 13 and 14, corresponding to the number of exposures that has been made. The coil spring 172 acts as a one-way clutch on the said counter-dial knob 168. The purpose of this construction will be more fully set forth in the description of the operation of the camera.

Still referring to Figs. 13, 14 and 15, and also and particularly to Fig. 18, there is fitted to the mechanism plate 20 a stud 176 having a head 177, a reduced diameter portion 178 and a threaded end 179, the said stud being fitted to the said mechanism plate 20 by such reduced diameter portion 178 which is itself fitted into a suitable hole provided therefor and is securely locked by a washer 180 and a nut 181. Fitted to the stud 176 between the head 177 and the washer 182 is a bushing 183 which is free to turn on the stud 176 but has a press fit in a second idler gear 184 meshing with the main shutter rewind gear 117 for rewinding the shutter curtain.

Referring now to Figs. 13, 14, 16 and 19, and particularly to Fig. 16, wherein the structure to be described is shown in section, there is riveted to the mechanism plate 20 a stud 185 having an enlarged shoulder 186 and a reduced diameter 187 passing through a suitable hole in the mechanism plate 20 and riveted thereto. Fitted over the stud 185 is a bushing 188 over which itself is fitted a film clutch drive gear 189 provided with a hub 190, to which hub is fitted a spacing plate 191 and an overrunning interclutch member 192, the said clutch member 192, the spacing plate 191 and the film clutch gear 189 being riveted together by shoulder rivets 193, 193 passing through suitable holes provided in the parts.

Referring to Fig. 16, running on the outer surface of the interclutch member 192 is the film feed clutch gear 150 previously referred to, and that meshes with the previously described film feed drive gear 143. Also fitted to the hub 190 is a ratchet plate 194 provided with studs 195, 195 passing through the ratchet plate 194 and engaging clutch rollers, one of which is shown at 196 in Fig. 16, the said ratchet plate 194 being provided with clearance holes 194a to allow free movement of the shoulder rivets 193, 193. This entire assembly is held to the stud 185 by a retaining plate 197 and a lock screw 198.

The interclutch member 192 is provided with usual notches 199, shown in dotted lines in Figs. 13 and 14. The rollers 196 are fitted in the said notches 199. Connecting the shoulder rivets 193, 195 are springs 200. Inasmuch as the shoulder rivet 193 is permanently attached to the interclutch member 192 and the shoulder rivet 195 is securely attached to the ratchet plate 194, the said springs 200 will cause the said ratchet plate 194 to be turned in a clockwise direction, thereby causing the rollers 196 to engage the bore of the film feed clutch gear 150. If such latter gear 150 is caused to be turned in a clockwise direction, the rollers 196 will be caused to move in a clockwise direction, thus wedging between the interclutch member 192 and the bore of the film feed clutch gear 150, thereby causing the said interclutch member 192 to be also driven in a clockwise direction. If, however, the teeth of the ratchet gear or plate 194 are engaged and prevented from moving, the rollers 196 will be prevented from moving in a clockwise direction, thus releasing them from engagement with the bore of the said film feed clutch gear 150. When the said ratchet wheel or plate 194 is released, the springs 200 will again cause the rollers 196 to be moved in a clockwise direction, and the interclutch member 192 will be driven by the said rollers 196 and the film feed clutch gear 150.

The full purpose of the structure just described in detail will be fully set forth in connection with the explanation of the complete operation of the camera.

*The film feed mechanism.*—I will next describe the film feed mechanism, following which I will set forth in detail the electrical mechanism by means of which the film is fed for the successive exposures and by which the shutter is operated, and the means by which the automatic cycling is controlled by the operation of the shutter itself. I will first refer to Figs. 4, 13 and 14.

On the mechanism plate 20 is mounted a stud 201 to which is attached a bushing 202 having riveted thereto a film feed clutch bell crank 203 held to the stud 201 by shoulder screw 204 and provided with a cam-shaped formation 205 for engaging the pin 148 previously referred to as provided on the crank member 147. The purpose of the pin 148 will be more fully set forth subsequently. The upper arm of the bell crank 203 is provided with a dog 206 to engage the teeth of the ratchet wheel 194, and on the extreme upper end of the bell crank 203 is a finger-like extension 207 for engaging a notch 208 of the film measuring cam 51 previously referred to, such notch being best shown in Fig. 14. About the stud 201 of the hub or bushing 202 is a spring 209, one end whereof is hooked around one of the motor screws 124 and the opposite end whereof is hooked to the bell crank 203, causing the latter to be turned in a clockwise direction.

When the finger 207 of the bell crank 203 is held out of the notch 208 of the said film measuring cam 51, the ratchet plate 194 will be allowed to rotate, thus causing the film clutch drive gear 189 to be driven through the clutch members previously referred to.

Since the said clutch drive gear 189 is in mesh with the film feed gear 67, as shown in Fig. 13, the film spool will be caused to rotate in a contraclockwise direction, winding the film until the clutch drive gear 189 is again stopped.

As the film moves over the measuring roll 47 (Figs. 4 and 7), the said measuring roll will make one revolution, as will also the film measuring cam 51, and the notch 208 will be engaged by the finger 207, thus permitting the bell crank 203 to rotate in a clockwise direction under the influence of the spring 209, and the dog 206 will engage the teeth of the ratchet wheel 194, disengaging the clutch and the clutch drive gear 189, and the gear 67 will be stopped from further rotation. The measuring roll 47 and its rubber sleeve 52 are of such diameter as to cause just sufficient film to be fed when making one revolution to provide a new area of sensitized material for the next exposure.

*The electric switches.*—I will now particularly refer to the electrical switches and cooperating parts, by which not only the feed of the film is controlled, but also the operation of the shutter, and will first refer particularly to Figs. 13 and 14.

To the mechanism plate 20 is attached a switch support plate 210 by means of rivets 211, 211 and to said switch support plate 210 is attached a switch 212, being a standard switch of any one of several different acceptable types. Herein for the purpose I have illustrated a switch known in the trade as the "Acro" switch, which is attached to the said switch support plate by screws 213, 213. The said switch 212 is provided with contacts 214, 215 and 216. The contact 216 is carried on a spring 217 actuated by a semicircular spring 218 through a short flat spring 219 and a pin 220. When said pin 220 is moved in an upward direction viewing Figs. 13 and 14, the position of the semicircular spring 218 is changed, thus altering the center of effort, causing the spring 217 to be moved downward, thus closing contacts 216 and 215. When the pin 220 is released, it will be moved in a downward direction by the spring 219, thus again changing the center of effort of spring 218 and causing the spring 217 to be moved in an upward direction, thus causing the meeting of contacts 216 and 214.

The said switch 212 is actuated by the bell crank 82, previously described and shown most clearly in Figs. 6 and 13. The said bell crank 82 is provided for the purpose with an arm 221 having a turned-over end 222 for co-acting with the pin 220. The said bell crank 82 is acted upon by the cam plate 146, previously described, through the finger 82a of the bell crank 82 when the film feed drive gear 143 is rotated, as will be subsequently more fully described.

Still referring to Figs. 13 and 14, attached to the said mechanism plate 20 is a second switch support plate 223 by means of rivets 224 and attached to the said support plate is a switch 225 of structure preferably similar to the switch 212 excepting that it is provided with contacts 226 and 227 only. The said switch 225 is also provided with a similar semicircular spring 228, a contact spring 229, a short actuating spring 230 and an operating pin 231. The said switch 225 is attached to the switch support plate 223 by screws 232, 232.

*Switch operating mechanism.*—I will next describe the switch operating mechanism for the electrical circuit controlling the shutter and film feeding means, and for that purpose I will refer to Figs. 13 and 14 and also to Fig. 8.

Mounted upon the said mechanism plate 20 is a switch operating lever 233 pivoted to a stud 234 on said plate, said operating lever being securely held upon the stud 234, so as freely to rotate thereon, by means of a large head screw 234a, and said operating lever is provided with a notch 235 to limit its motion, said notch co-acting with a pin 236 on the mechanism plate 20. The said switch operating lever is moved in a clockwise direction by a spring 237 fitted over a stud 238 attached to the said operating lever and pressing against the switch housing of the switch 225.

The said switch operating lever 233 serves both as a switch operating lever and also as a shutter run-down stop lever, it being engaged by the pin or stud 116 on the second curtain rewind gear 98 when the shutter is released and runs all the way down, thus limiting the motion of the said second curtain rewind gear 98. At the same time it causes the contacts 226 and 227 to be closed, thus completing the circuit to the motor in a manner herein subsequently described.

Referring particularly to Fig. 14, there is attached to the lower end of the bell crank 82 a short L-shaped arm 239 by means of a shoulder rivet 240, the said L-shaped arm being caused to be rotated in a contraclockwise direction under the influence of a spring 241 fitted around said shoulder rivet 240, one end of said spring being connected to the bell crank 82 and the opposite end to said L-shaped arm 239. When the bell crank 82 is caused to be moved to the right or contraclockwise viewing Fig. 14 by the cam 146, the teeth of ratchet wheel 170 will be engaged, thus causing the exposure counter-dial 169 to be rotated in a contraclockwise direction, said dial being prevented from turning clockwise by the clutch spring 172.

Still referring to Figs. 8, 13 and 14, there is attached to the mechanism plate 20 a bushing 243 through which passes a shaft 244 having a reduced diameter indicated in dotted lines at 245, and to which is there fitted a hub 246 having an attached crank arm 247 securely attached to hub 246 by shoulder screw 248 which serves to attach both parts to the shaft 245. The opposite end of the shaft 244 is provided with an enlarged diameter 249 to which is securely attached a shutter release lever 250 which is provided to engage the pin or stud 116 when the shutter is fully wound.

Still referring to Figs. 13 and 14, attached to the mechanism plate 20 is a magnetic solenoid 251 (indicated also in the diagram Fig. 3) by means of a strap 252, bolts 253 and nuts 254, said solenoid having the usual plunger or armature shown in dotted lines in said figures and indicated at 255, and which is provided with an enlarged collar 256 between which and the solenoid housing is a spring 257 causing the armature to move to the right viewing Figs. 13 and 14, the right-hand end of said armature being provided with a hook member 258 having a slot 259. Securely attached to the said crank arm 247 is a pin 260 which is acted upon by the hook member 258 when the solenoid 251 is energized. When the circuit is broken, the spring 257 causes the solenoid plunger or armature to be moved to the right, viewing Figs. 13 and 14, said spring co-acting with the collar 256 to prevent too great a movement of said plunger or armature 255 in a right-hand direction viewing said figures. A stop pin 261 is provided on the mechanism plate 20 and there is also provided a cooperating protruding lip 262 on the said crank arm 247.

*The shutter curtain rollers.*—I have previously described the structure of the two-curtain shutter excepting as to certain details of the tension rollers and take-up rollers thereof, which I will now set forth.

Inasmuch as the spring take-up roller 93 for the first curtain and the spring take-up roller 94 for the second curtain are of identical construction, I will for brevity here describe or refer only to tension roller 94, and will refer particularly to Fig. 19, but it is to be understood that both said rollers have the same structure.

Fitted into a hole provided therefor in the mechanism plate 20 is a shaft 263 extending through said tension roller 94 and through the outer plate 21, and securely locked thereto by means of a washer 264 and a nut 265, as shown in Fig. 4. Said tension rollers 93 and 94 are provided with bushings 266 on either end. Each such bushing on the right-hand end, viewing Fig. 19, is provided with a hole through which passes the end 267 of the tension spring 268, thus locking one end of said spring to the proper tension roller. The opposite end of said tension end of said tension spring 268 is anchored to the shaft 263, but is not herein shown. Between each bushing 266 and the mechanism plate 20 is a thrust washer 269, and between such bushing 266 on the opposite end of said curtain tension roller and the outer plate 21 is a second thrust washer 270, shown in Fig. 4.

*The two-curtain shutter movements.*—I will now describe the shutter, and for that purpose I will refer mainly to the vertical sectional view (Fig. 8), to the sectional views (Figs. 20, 21 and 22) showing the shutter rewinding mechanism, to Figs. 23 to 27 showing different positions of such rewinding mechanism, and to Figs. 28 to 34 showing the two curtains in longitudinal section and in plan.

Attached to the first curtain tension roller 93 and partly wound thereon and attached also to the first curtain take-up roller 91, is the first curtain 271 provided with an exposure slot or opening 272 and having the usual curtain struts 273, 273. Attached to the second curtain tension roller 94 and partly wound thereon is the second curtain 274 which at its opposite end is attached to the second curtain take-up roller 92. The said second curtain 274 is provided with an exposure slot or opening 275 having the usual struts 276, 276. The first curtain take-up roller 91 is connected as shown in Figs. 11 and 12 to the first curtain rewind gear 102 by means of pinion 101 and shaft 100. The second curtain take-up roller 92 is, as shown in Figs. 9 and 10, connected to the second curtain rewind gear 98 by means of the pinion 97 on the shaft 96. When said second and first curtain rewind gears 98 and 102 are caused to be turned in a contraclockwise direction, the said take-up curtain rollers 91 and 92 will be caused to turn in a clockwise direction, thus winding said first and second curtains 271, 274 upon their respective tension rollers.

The main shutter rewind gear 117 (Figs. 20, 21 and 22) is caused to be turned in a contraclockwise direction by means to be subsequently more fully referred to, carrying with it the driving plate 118 and the shutter rewind clutch member 119. The end of the shutter rewind clutch 119a, Fig. 21, will engage the stud 111 of the first curtain rewind gear 102, causing it to be turned in a contraclockwise direction, causing pinion 101 to be turned in a clockwise direction, and causing the first curtain take-up roller 91 also to be turned in a clockwise direction, thus winding said first curtain 271 on its take-up roller 91. The second curtain rewind gear 98 will also be driven in a contraclockwise direction by reason of the collar 113 engaging the stud 115 of the second curtain rewind gear 98 after said first curtain has traveled a distant sufficient to cap the second curtain 274, as shown in Fig. 28. The pinion 97 will now be turned in a clockwise direction, thus winding said second curtain 274 on its take-up roller 92, and when said second curtain reaches the position shown in Fig. 29, the second curtain rewind gear 98 therefor is caused to be disengaged from the stud 111 by reason of the cam plate 277 attached to the mechanism plate 20 by rivets 278, 278, as shown in Fig. 20.

As the main shutter rewind gear 117 continues to turn in a clockwise direction, the curved end 119b of the shutter rewind clutch member 119 will ride along the under face of the cam 277, thus disengaging the end 119a of the said clutch member 119 from the stud 111, as shown in Fig. 22, but just previous to such disengagement the stud or pin 116 had moved past the end of the shutter release lever 250 (best shown in Figs. 13 and 14), thus preventing the second curtain rewind gear 98 from turning in a clockwise direction when the stud 111 becomes disengaged from the shutter rewind clutch member 119, as previously described, so that the first curtain rewind gear 102 will be permitted to turn in a clockwise direction until the stud 110 engages the stud 115 of the second curtain rewind gear 98, thus preventing further movement of said first curtain rewind gear 102 in a clockwise direction, as indicated in Fig. 22. The two curtains will now be in the position shown in Fig. 30 with the exposure slot or opening A formed between said two curtains.

In Fig. 23 is shown the position of the several parts, just prior to the act of releasing the first curtain rewind gear 102 from the shutter rewind clutch member 119, and it will be noted that the stud or pin 116 has traveled some little distance beyond the shutter release lever 250. The driving stud 111 has not at this time been released, but said stud 111 is at the point when any further movement in a contraclockwise direction of the main shutter rewind gear 117 will cause said stud 111 to be released, thereby allowing both curtain rewind gears 98 and 102 to turn in a clockwise direction. However, as soon as the stud or pin 116 of the second curtain rewind gear 98 reaches the shutter release lever 250, said second curtain rewind gear 98 will be held from further movement, but the first curtain rewind gear 102 will be allowed to turn in a clockwise direction until the stud 110 of the first curtain rewind gear 102 is stopped by the stud 115 of the second curtain rewind gear 98. The mechanism will now be in the position shown in Fig. 24, and the curtain exposure slot or opening A will be established as shown in Fig. 30.

When the shutter release lever 250 is operated by the solenoid magnet 251, previously referred to, the pin or stud 116 will be disengaged by the shutter release lever 250, allowing both said curtain rewind gears 98 and 102 to turn in a clockwise direction. The stud 110 will remain in contact with the stud 115 until the stud or pin 116 is stopped from further movement by the switch operating lever 233, shown in Fig. 25 and elsewhere.

Then the main shutter rewind gear 117 is again caused to be turned in a contraclockwise direction, carrying with it the driving plate 118 of such shutter rewind clutch member 119, the latter will engage the stud 111 in the manner previously described, thus winding the first curtain 271 into the position shown in Fig. 28, in which position said first curtain caps the exposure slot or aperture 275 of the second curtain 274, which reciprocally caps the exposure slot or aperture 272 of the first curtain 271. The collar 113 will then engage the stud 115, causing the second curtain 274 to be driven until the main shutter rewind gear 117 makes a complete revolution, and before the end of such complete revolution the shutter rewind clutch member 119 will be disengaged from the stud 111 through the action of the cam plate 277 engaging said shutter rewind clutch member 119.

In Fig. 26 is shown the relation of the said shutter rewind clutch member 119 just before its action upon the cam plate 277, and in Fig. 27 the shutter rewind clutch member 119 is shown as having been acted upon by the cam plate 277, so that the stud 111 has been disengaged and the first curtain rewind gear 102 has turned in a clockwise direction a distance sufficient to establish the curtain exposure slot or opening.

It will be noted that the first curtain take-up roller 91 is of a somewhat larger diameter than the second curtain take-up roller 92. This is for the purpose of allowing the first curtain 271 to move at a slightly greater rate than the second curtain 274, so as to allow the aperture A, as indicated in Fig. 33, to increase as the two curtains travel across the exposure opening 22a of the camera.

In Fig. 33, the exposure slot or aperture formed at A at the start of the curtain travel is of less dimension in its direction of travel than the exposure slot or aperture formed at B (Fig. 34) when the two shutter curtains approach the end of their travel across the said exposure opening 22b of the camera. This is to compensate for curtain acceleration. In other words, exposure time is dependent upon the width of the exposure slot or aperture and curtain speed, and since all shutter curtains accelerate in their travel from the curtain take-up roller to the curtain tension roller, it is necessary to provide means for compensating for this decreasing exposure speed. In the present invention I accomplish this by slightly increasing the width of the exposure slot or aperture A to the width indicated at B. I may, however, provide any compensation desired, as by adjusting or varying the diameter of the curtain take-up rollers 91, 92.

*The camera cycle.*—I will now refer to Fig. 3 and Figs. 13 to 19, and will describe a cycle of the camera when using the curtain shutter mechanism and the control therefor just described. Preliminarily, I state that thus far I have referred to a shutter mechanism having provision for one width only of the exposure slot or aperture. This is entirely satisfactory for a great number of uses of the camera herein disclosed, but for other uses of the camera it is necessary to be able to change the shutter exposure aperture width so as to provide a greater range of shutter speeds. The disclosed means for doing this I will refer to more fully after I have described the camera cycle when using the shutter mechanism as thus far disclosed, since such camera cycle is in no way changed when using the shutter with provision for changing the aperture exposure width thereof.

*The electrical circuit wiring.*—In Fig. 3, I have shown a diagram of the electrical circuit of the camera, and in Fig. 13 I show the camera mechanism in condition for making an exposure under the control of such circuit, Fig. 14 showing the condition of the mechanism when the shutter curtains have run all the way down.

The two-curtain shutter in the position of parts shown in Fig. 13 has been fully rewound and is held in position for making an exposure by means of the shutter release lever 250 and the stud or pin 116. The switch 225 is in open condition because the switch operating lever 233 has been moved to the right, viewing Fig. 13, by the spring 237, and the switch 212 is in condition to complete a circuit from the receptacle 279 that, as shown in Figs. 1, 2, 13 and 14, is attached to the mechanism plate 20 by means of screws 280, 280, inasmuch as the arm 221 of the bell crank 82 has been moved away from the switch pin 220, thus allowing the contacts 214 and 216 to be closed. The shutter will now be caused to operate if the external switch 281 is closed, which switch can be located anywhere convenient for the operator, and if desired within or upon the camera itself. It is shown merely diagrammatically in Fig. 3. A complete description of the wiring diagram shown in Fig. 3 is as follows:

One wire 282 from the switch 281 is connected to the terminal 283 of the receptacle 279 and a second wire 284 is connected to that terminal and extends to the contact 214 of the switch 212. Connecting contact 216 is a wire 285 that connects to a terminal 286 of a receptacle 287 (shown in Figs. 1, 13 and 14) which is held to mechanism plate 20 by means of screws 288. A lead wire 290 is connected to the terminal 286 of the receptacle 287 that leads to contact 227 of the switch 225 and connected to wire 290 is a short lead 291 that connects to the battery 292. The other side of the battery 292 is connected by wire 293 to the terminal 294 of said receptacle 287 and connected to the terminal 294 by a short wire 295 is a fuse 296. Also connected to said fuse 296 is a short wire that connects with one end of the resistor 297 and to one side of the switch 298. A wire 299 leads from said switch 298 and is connected to the other terminal of said resistor 297 and connects to a motor brake solenoid 300. Also connected to the wire 299 is one motor brush 301 and one side of the solenoid 251. The other side of said solenoid 251 is connected to the terminal 302 of said receptacle 279 by a wire 303. Connecting the contact 215 of said switch 212 is a wire 304 that connects to the motor brush 305 and to said motor brake solenoid 300. Also connected with the contact 215 of said switch 212 is a wire 306 that connects with the contact 226 of said switch 225, and connected with the contact 227 of the switch 225 is a wire 307 that connects to one side of the battery 292, and to said lead wire 290 that is connected with the terminal 286 of said receptacle 287.

When the mechanism is in the position of parts shown in Fig. 13, switch contacts 226 and 227 of switch 225 will be in open condition, and the contacts 214 and 216 will be in closed condition. Therefore, no current will flow to the motor 123 and no current will be flowing through the brake solenoid 300, but when the switch 281 is closed, current will flow from the battery 292 through wire 290, through wire 285, contacts 216 and 214, through wire 284, terminal 283, wire 282, switch 281, wire 308, terminal 302, solenoid 251, wire 299 and either through the resistor 297 or through switch 298 through fuse 296, through wire 295, terminal 294, wire 293 and back to the battery 292. The solenoid will now cause the shutter release lever 250 to be moved to the right, viewing Fig. 13, as previously described, releasing the two-curtain shutter which will be allowed to run down, as shown in Fig. 14. As the said shutter runs down, the pin 116 contacts with the lower end of the switch operating lever 233 causing the switch 225 to be operated, thereby closing contacts 226 and 227. Current will now flow from the battery 292 through wire 291, wire 307, contacts 226 and 227, wire 306 and 304, motor brush 305, through the motor to brush 301 through either the resistor 297 or the switch 298, through fuse 296, wire 295, terminal 294, and wire 293 to the battery 292. Since the brake solenoid 300 is in parallel with the brushes 301 and 305, current will flow through the solenoid 300, thus causing the motor brake to be relieved.

*The cycle of operation of the mechanism controlling the shutter rewind and the film.*—The electric motor 123 will now start to operate and through its speed reducing mechanism, previously referred to, it will drive the interrupted gear 144 (Fig. 17) in a contraclockwise direction until the teeth thereof engage the teeth of the second interrupted gear 151, at which time the drive gear 157 will be turned in a clockwise direction and the idler gear 167 will be turned in a contraclockwise direction. The intermediate gear 184 will be turned in a clockwise direction and the main shutter rewind gear 117 in a contraclockwise direction, thereby rewinding the two curtain shutter in the manner previously described. Soon after the said interrupted toothed gear 144 starts to rotate, the nose 82a of the bell crank 82 will be acted upon by the cam 146, causing the said bell crank 82 to be moved to the right, viewing Fig. 14, which movement in a contraclockwise direction causes switch operating pin 220 of the switch 212 to be operated, thereby opening the contacts 214 and 216 and breaking the circuit to the shutter release solenoid 251 and closing the contacts 215 and 216, which are shunted around the contacts 226 and 227 of the switch 225. This continues the circuit to the motor after the second curtain rewind gear 98 starts to rotate in a contraclockwise direction, thus carrying with it the stud or pin 116 from contact with the switch operating lever 233. The switch contacts 226 and 227 will then be caused to open by the spring 237 and the electric motor 123 will continue to operate until the interrupted toothed gear 144 has made a complete revolution, at which time the nose 82a of the bell crank lever 82 will drop off the cam 146, thus allowing the bell crank lever 82 to move to the left (that is, in a clockwise direction, viewing Figs. 13 and 14), thus allowing the switch operating pin 220 to move in a downward direction, causing the contacts 214 and 216 to be opened, thus stopping the motor. This completes the shutter rewind cycle.

At the commencement of the said cycle, the pin 148 carried on the crank member 147 is caused to turn in a contraclockwise direction, thus acting upon the cam-shaped formation 205 of the bell crank 203, causing the latter to be turned in a contraclockwise direction and at the same time withdrawing the pawl 206 from the teeth of ratchet wheel 194. The film feed clutch gear 150 will now be caused to be driven clockwise through the film feed clutch means, turning said film feed gear 67 contraclockwise, thus winding the film on the film take-up spool positioned on shaft 65 provided in the stud 60. Film will be drawn off the spool that is placed upon the studs 57 and 58 and will be fed around the idler roll 43, under the pressure pad or plate 56, around the measuring roll 47 and onto the take-up spool just referred to. The path of the film of sensitized material is clearly shown in Fig. 7.

When sufficient film has passed over the surface of the measuring roll 47, the notch 208 (Fig. 14) of the measuring cam 51 will reach the position shown in Fig. 13, wherein the L-shaped finger-like member 207 of the bell crank 203 will drop into notch 208, thus allowing the bell crank 203 to be rotated in a clockwise direction. The pawl 206 will engage the teeth of the ratchet gear or plate 194, thus disengaging the film feed clutch gear 150 (Fig. 13), and no further film will be wound on the film take-up spool.

A complete cycle of operation has now taken place in the course of which the shutter has been released and has run down, the motor has been energized, the shutter has been completely rewound, and a new area of film has been fed into place. As the bell crank 82 was first moved to the right and then to the left viewing Figs. 13 and 14, the ratchet wheel 170 will have been caused to move a distance equal to one tooth of said ratchet wheel, thus advancing the film counter-dial one numeral, the film counter-dial previously having been set to the letter "S" when a new supply of film was placed in the camera. This can be readily done by rotating the knob 168 in a contraclockwise direction until the letter "S" appears in the window shown in dotted lines as provided in the cover plate 31 and indicated at 31a in Fig. 1. The letter "S" is used upon the camera in place of zero to signal the start of the first exposure.

The foregoing disclosure is of a photographic camera provided with a two-curtain shutter without the provision of means for changing the exposure slot or aperture for the purpose of making exposures having definite exposure timing. It is often desirable in a camera of this type to have means for changing the size of the exposure aperture in the picture-taking direction of movement of the shutter. I will now describe one embodiment of means for accomplishing this purpose, shown in Figs. 35 to 44, but to which mechanism my invention is not restricted.

*The mechanism for changing the shutter exposure aperture.*—Referring first to Figs. 35 and 36, there is attached to the mechanism plate 20 a stud 308 having a reduced diameter portion 309 threaded as shown and receiving a nut 310 and a lock washer 311. Fitted over the said stud 308 is an enlarged collar 312 serving to space the shutter rewind gear 117 from the said mechanism plate 20. The said main shutter rewind gear 117, the disk 118 and the clutch 119 are exactly the same as in the construction already described, and hence need no further description at this point. Integral with said stud 308 is an enlarged flange 313 serving to hold said main shutter rewind gear 117 and the disk 118 to the mechanism plate 20. Fitted over said stud 308 is the first curtain rewind gear 314 having a hub 315 and also fitted over the said stud 308 is the second curtain rewind gear 316 having a hub 317, both said curtain rewind gears being held in place on said stud 308 by a large head screw 318. Attached to the said second curtain rewind gear 316 is a latch plate 319, by means of rivets 320, 320, to be subsequently referred to.

Fitted to the gear hub 317 is a shutter setting knob 321 provided with an enlarged diameter 322 and a knurled diameter 323, said knob being caused to be moved toward the second curtain rewind gear 316 by spring 324, one end whereof rests against the spring retainer plate 325 attached to the hub 317.

The first curtain rewind gear 314 is provided with a drive pin 326 for engaging the film rewind clutch member 119, as previously described, and said gear 314 is also provided with a second pin 327 extending through a notch 328 in the latch plate 319 and partially through a segmentally shaped opening 329 in the said second curtain rewind gear 316. The knob 321 is provided with a pin 330 also passing through the said segmental opening 329 of the second curtain rewind gear 316, and into the slot 328 of the latch plate 319. The knob 321 is provided with a pin 331 (shown in dotted lines in Fig. 35 and in solid lines in Fig. 39), said pin 331 engaging a series of holes 332 in said second curtain rewind gear 316, one of said holes being shown in section (Fig. 39) and all the said holes being shown in Figs. 43 and 44.

The operation of the shutter having the described provision for changing the area of the exposure aperture is precisely the same as that of the single exposure aperture shutter of the two curtain type previously disclosed herein. The said main shutter rewind gear 117 is caused to be turned in a contraclockwise direction, turning with it the driving plate 118 and the film rewind clutch member 119 having a drive end 119a that engages the drive pin 326 of the first curtain rewind gear 314 which is then caused to be turned in a contraclockwise direction, viewing Fig. 41, carrying with it pin 327 which will turn in a contraclockwise direction in the segmental opening 329 of the second curtain rewind gear 316, and in the slot 328 of the latching plate 319 until the pin 327 reaches the end of the said segmental opening 329.

The said second curtain rewind gear 316 and the latching plate 319 will now be turned in a contraclockwise direction until the dog 333 of the latching plate 319 passes the shutter release pawl 250, at which time the film rewind clutch member 119 will be disengaged from the pin 326 by means of cam plate 277 (Figs. 21 and 22), as previously described. The said second curtain rewind gear 316 will then be allowed to turn slightly in a clockwise direction until the dog 333 is engaged by the shutter release lever 250, and the first curtain rewind gear 314 will turn in a clockwise direction until the pin 327 is stopped from moving further in a clockwise direction by the pin 330 attached to the shutter setting knob 321. An exposure slot or aperture is now established in the curtain structure for making an exposure.

If the pin 331 of the shutter setting knob 321 is moved to engage a different hole 332 in the second curtain rewind gear 316, the position of the pin 330 will be correspondingly changed, as shown in Fig. 40, wherein pin 330 has been moved all the way in a clockwise direction, thus allowing the greatest possible travel of the pin 327 and the first curtain rewind gear 314, thereby establishing the greatest possible dimension of the exposure slot or aperture of the shutter. If the pin 331 were fitted in one of the other holes 332, the pin 327 and the first curtain rewind gear 314 could not rotate so far in a clockwise direction and in such case there would be established an exposure slot or aperture of a narrower width.

It will be readily understood that the second curtain rewind gear 316 may be provided with any number of holes 332 for engaging the pin 331 of the knob 321, thus providing means for obtaining any number of exposure slot or aperture widths in the shutter curtain structure.

It will be assumed that the shutter is in a wound-up condition ready for making an exposure. The shutter release lever 250 will be caused to operate in the manner previously described, thus disengaging the dog 333 of the latching plate 319. Both shutter rewind gears 314 and 316 will now be allowed to turn in a clockwise direction, thus allowing the pinions 97 and 101 to turn in a contraclockwise direction, thereby causing the said shutter curtains 271 and 274 to travel across the exposure opening of the camera. When the said shutter curtains run all the way down, the said second curtain rewind gear 316 will be stopped from further movement because the dog 333 will be engaged by the switch operating lever 233.

By providing graduations on the shutter setting knob plate 334, as indicated by the numerals 250, 500, 1000 and the index marker 335 on the shutter spring retaining plate 325, as indicated in Fig. 2, any selected exposure aperture can be secured by causing the knob 321 to be moved in a right-hand direction, thus disengaging the pin 331 from the hole 332 in said second curtain rewind gear 316, and then rotating the knob 321 until the index marker 335 is aligned with the proper shutter speed. The pin 331 will then engage the proper hole 332 in the said shutter curtain rewind gear 316. The knob 321 is moved to the left (that is, in an upward direction), as shown in Fig. 39, by means of the spring 324 in order to provide the proper spacing of the pin 330, so as to cause the proper size exposure slot or aperture to be established by the curtains for a corresponding exposure speed.

It has been stated hereinabove that the cycling means is controlled by the operation of the shutter. In order that this statement may be fully understood, the timing and order of movement of the parts will be recapitulated. The operation of the shutter from the time the contacts are closed at the switch 281 until the cycle is completed has, of course, been stated, in describing the details of the structure. A resumé of the entire operation is as follows.

The switch 281 is closed thus energizing the solenoid 251. It will be assumed that the mechanism is in the condition shown in Fig. 13. The shutter release lever 250 will be caused to turn in a clockwise direction, disengaging pin 116, allowing rewind gear 98 and rewind gear 102 to rotate in a clockwise direction under the influence of pinions 92 and 101, thus allowing the curtains to move across the exposure aperture in a left-hand direction viewing Fig. 13, until the pin 116 is stopped by the operating lever 233, which at this time will be caused to turn in a contraclockwise direction, operating switch 225, which will complete a circuit to the motor 123 causing it to revolve, thus turning the interrupted gear 144 and film rewind gear 143 in a contraclockwise direction. The interrupted gear 144 will, at the proper time, cause the second interrupted gear 151 to turn in a clockwise direction, turning with it gear 157 in the same direction. This will cause idler gear 167 to be turned in a contraclockwise direction and second idler gear 164 to be turned in a clockwise direction, thus turning the main rewind gear 117 in a contraclockwise direction, and through the rewind clutch, gears 98 and 102 will be caused to turn in a contraclockwise direction, thus turning pinions 92 and 101 in a clockwise direction until the shutter is fully rewound. At this time, the pin 116 will be in the position shown in Fig. 23 and the cam plate 146 will be in the position shown in Fig. 13, and the bell crank 82 will be in the position shown in Fig. 13, having just dropped off the cam 146, thus allowing the switch 212 to operate, opening the circuit to the electric motor. Just as the nose 82a of the bell crank 82 dropped off the cam face of cam 146, the rewind clutch was caused to be disengaged as previously fully described, allowing rewind gears 98 and 102 to turn a short distance in a clockwise direction until stopped by the shutter release lever 250. The shutter is now ready for a second exposure. The mechanism will be positioned as shown in Fig. 13. The exposure aperture will have been established in the curtain all ready for making an exposure.

The operation of the shutter and cooperating parts as thus set forth is therefore very clearly distinguished from the electrical control for functioning parts of an aerial camera set forth in a co-pending application Ser. No. 476,456, filed February 19, 1943, now Patent Number 2,371,592, issued March 13, 1945, in the names of Louis D. Nadel, Archie H. Gorey, Reynold J. Nitsch and Oscar Steiner, wherein the shutter is operated mechanically for the making of a picture through cycling mechanism. Said co-pending application is assigned to The Folmer Graflex Corporation, of Rochester, New York, to which the present application is also assigned. Therefore, in the construction disclosed in the present application there is no delay in the shutter operation as the motor does not start to operate until the shutter has been operated and is entirely across the exposure aperture of the camera. Hence, it is impossible to have the cycle take place or even to begin before the shutter has traveled completely across the exposure opening of the camera. Therefore, no matter to how fast a speed the camera cycle be adjusted, it cannot in the present disclosure operate so fast that the shutter does not have time to travel all the way across the exposure opening of the camera, because the cycle cannot commence until the shutter has traveled all the way across the exposure opening, the rewind cycle being controlled from the shutter through the operating lever 233, coacting with the pin 116 and the switch 225.

In the present disclosure there is provided a true self-capping variable aperture shutter. The shutter is always rewound in a capped condition and the exposure slot or aperture is established just as the shutter is completely rewound and before releasing it for an exposure. Such construction is therefore clearly distinguished from that shown in the patent to Petit & Hineline 1,980,546, dated November 13, 1934, wherein the exposure slot or aperture is adjusted by the operator prior to making an exposure and that exposure slot or aperture travels across the exposure opening both when making an exposure and when rewinding the shutter.

So far as I am aware, I believe that I am the first to provide any means to cause positively an increase in the size of the curtain exposure slot or aperture as the curtain travels across the exposure opening, thus compensating for the inevitable acceleration in the speed of the shutter curtain in its travel. As herein disclosed, I accomplish this result by providing curtain rewind rollers of contrasting diameter. I thus cause the exposure slot or aperture to enlarge as said exposure slot or aperture travels across the exposure opening of the camera at a controlled rate of speed, the means for accomplishing this being the difference in size of the two-curtain rewind rollers. If one of said rollers is larger than the other, the former will feed off more curtain substance than the other, and if the larger roller pertains to the leading curtain, this will cause the exposure slot or aperture to enlarge in size. If, however, the larger rewind roller pertains to the second or following curtain, this will cause the exposure slot or aperture to become smaller during curtain travel.

Having thus described one illustrative embodiment of the invention, it is to be understood that although specific terms are employed, they are used in a generic and descriptive sense and not for purposes of limitation, the scope of the invention being set forth in the following claims.

I claim:

1. A photographic camera having a focal plane shutter consisting of two, closely parallel, cooperating apertured curtains, such apertures together providing the exposure aperture, a motor, starting and stopping means therefor, means for establishing driving connections between said motor and said shutter when the shutter is in its run-down condition following exposure in the preceding cycle, to rewind the curtains constituting said shutter for the next cycle, whereby rewinding of the curtains constituting said shutter is controlled by said motor, and said motor is started for said next cycle by said driving connections when in the run-down condition of the said shutter, the camera being also provided with film-feeding mechanism, and having operating connections between such mechanism and said motor such that after the said shutter is operated to make the exposure, a new area of film is fed.

2. A photographic camera having a focal plane shutter consisting of two closely parallel, cooperating curtains together providing the exposure aperture, gearing for causing exposure movement of and for rewinding said curtains, film feeding means, a motor, starting and stopping means therefor, and means for establishing operating connections from said motor to said rewinding curtain gearing, when the said shutter is in its run-down condition following exposure in the just preceding cycle, and to said film feeding means, whereby said motor through said operating connections causes the automatic execution of a new complete photographic cycle upon the said running down of said shutter in the preceding cycle, thus leaving the parts positioned for the execution of such new cycle upon motor operation.

3. A combination according to claim 2, but wherein the motor is an electric motor, and the camera is provided with a casing upon the inside of which said motor is mounted, said camera for that purpose having a mechanism plate 20 and the motor having a main drive shaft extending through said mechanism plate and there provided with a film feed drive gear and with a gear for operating the shutter.

4. A combination according to claim 2, but wherein the motor is an electric motor, and the camera is provided with a casing upon the inside of which said motor is mounted, said camera for that purpose having a mechanism plate 20 and the motor having a main drive shaft extending through said mechanism plate and there provided with a film feed drive gear, and with an interrupted gear connected to the shutter to rewind the curtains thereof.

5. A combination according to claim 2, but wherein the motor is an electric motor, and the camera is provided with a casing upon the inside of which said motor is mounted, said camera for that purpose having a mechanism plate 20 and the motor having a main drive shaft extending through said mechanism plate and there provided with a film feed drive gear 143, and with interrupted gear 144, and an interrupted gear 151 driven periodically by said gear 144 and connected to the shutter to rewind the curtain thereof.

6. A combination according to claim 2, but wherein the motor is an electric motor, and the camera is provided with a casing upon the inside of which said motor is mounted, said camera for that purpose having a mechanism plate 20 and the motor having a main drive shaft extending through said mechanism plate and there provided with a film feed drive gear 143, a film feed clutch gear 150, a drive gear 157 driven therefrom, and dial-control means operated by gear 157.

7. A combination according to claim 2, but wherein the motor is an electric motor, and the camera is provided with a casing upon the inside of which said motor is mounted, said camera for that purpose having a mechanism plate 20 and the motor having a main drive shaft extending through said mechanism plate and there provided with a film feed drive gear 143, a film feed clutch gear 150, a drive gear 157 driven therefrom, and dial-control means operated by gear 157, said motor shaft having thereon an interrupted gear 144, there being interrupted gear 151 meshing therewith, said curtains having rewinding gearing, and operating connections from said interrupted gear 151 thereto.

8. A photographic camera having a casing including as one wall thereof a mechanism plate 20, said camera having a focal plane shutter consisting of two closely parallel, cooperating curtains together providing the exposure aperture, an electric motor supported upon said mechanism plate and having a drive shaft extending therethrough, gearing mounted upon said mechanism plate 20 for causing exposure movement of and for rewinding said curtains, and movement transmitting gearing mounted upon said mechanism plate between said motor drive shaft and said curtain exposure movement gearing and the curtain rewinding gearing, and including means for establishing driving connections between said motor and said shutter, by said shutter reaching its run-down position following exposure in the preceding cycle, to rewind said shutter, whereby the rewinding of the curtains constituting the shutter is controlled by said motor, and film feed mechanism also mounted upon said mechanism plate, there being transmitting gearing connections between the shaft of said motor and said film feeding mechanism.

9. A photographic camera having a casing including as one wall thereof a mechanism plate 20, said camera having a focal plane shutter consisting of two, closely parallel, cooperating curtains together providing the exposure aperture, an electric motor supported upon said mechanism plate and having a drive shaft extending therethrough, gearing mounted upon said mechanism plate 20 for causing exposure movement of and for rewinding said curtains, and including means for establishing driving connections between said motor and said shutter when in its run-down condition following exposure, to rewind said shutter, and intermittently acting film feeding mechanism mounted upon said mechanism plate 20 and operatively connected to the shaft of said motor for driving the film feeding mechanism from said motor, said driving connections including a stud 201 on said plate 20, a film feed bell crank 203 mounted on said stud, film feed gear 67 also mounted on mechanism plate 20 for driving the film spool of the said film feeding mechanism, gear 150 on said mechanism plate 20 meshing with said gear 67, and film feed ratchet means co-axial with said gear 150 and controlled by said bell crank 203.

10. A photographic camera having a casing including as one wall thereof a mechanism plate 20, said camera having a focal plane shutter consisting of two, closely parallel, cooperating curtains together providing the exposure aperture, an electric motor supported upon said mechanism plate and having a drive shaft extending therethrough, gearing mounted upon said mechanism plate 20 for causing exposure movement of and for rewinding said curtains, and including means for establishing driving connections between said motor and said shutter when in its run-down condition following exposure, to rewind said shutter, and intermittently acting film feeding mechanism mounted upon said mechanism plate 20 and operatively connected to the shaft of said motor for driving the film feeding mechanism from said motor, said driving connections including stud 187 carried by said mechanism plate 20 and having fast thereon film feed clutch drive gear 189, film feed clutch gear 190, ratchet 194, and gear 150 on said mechanism plate, all in coaxial relation, and film feed gear 67 meshing with gear 150, for driving the film spool of said film feeding mechanism, and also carried by said mechanism plate 20.

11. A photographic camera having a casing including as one wall thereof a mechanism plate 20, said camera having a focal plane shutter consisting of two, closely parallel, cooperating curtains together providing the exposure aperture, an electric motor supported upon said mechanism plate and having a drive shaft extending therethrough, gearing mounted upon said mechanism plate 20 for causing exposure movement of and for rewinding said curtains, and including means for establishing driving connections between said motor and said shutter when in its run-down condition following exposure, to rewind said shutter, and intermittently acting film feeding mechanism mounted upon said mechanism plate 20 and operatively connected to the shaft of said motor for driving the film feeding mechanism from said motor, said driving connections including stud 187 carried by said mechanism plate 20 and having fast thereon film clutch drive gear 189, film feed clutch gear 190, ratchet 194, and gear 150 on said mechanism plate, all in co-axial relation, and film feed gear 67 meshing with gear 150 for driving the film spool of said film feeding mechanism, and also carried by said mechanism plate 20, and bell crank 203 carried by said plate 20 and having a formation to engage said ratchet 194 to hold the latter from rotation, thereby intermitting the film feed.

12. A photographic camera having a casing including as one wall thereof a mechanism plate 20, said camera having a focal plane shutter consisting of two, closely parallel, cooperating curtains together providing the exposure aperture, an electric motor supported upon said mechanism plate and having a drive shaft extending therethrough, gearing mounted upon said mechanism plate 20 for causing exposure movement of and for rewinding said curtains, and including means for establishing driving connections between said motor and said shutter when in its run-down condition following exposure, to rewind said shutter, and intermittently acting film feeding mechanism mounted upon said mechanism plate 20 and operatively connected to the shaft of said motor for driving the film feeding mechanism from said motor, said driving connections including stud 187 carried by said mechanism plate 20 and having fast thereon film feed clutch drive gear 189, film feed clutch gear 190, ratchet 194, and gear 150 on said mechanism plate, all in co-axial relation, and film feed gear 67 meshing with gear 150 for driving the film spool of said film feeding mechanism, and also carried by said mechanism plate 20, and bell crank 203 carried by said plate 20 and having a formation to engage said ratchet 194 to hold the latter from rotation, thereby intermitting the film feed, the said motor shaft having thereon a film feed drive gear 143, a cam plate 146, and a crank arm 147, all in a co-axial relation, the said bell crank 203 having a cam formation 205 to engage a formation on the crank member 147 for operating said bell crank 203, and a bell crank lever 32 operated by said cam plate 146 to control camera functions.

13. A photographic camera having a casing including as one wall thereof a mechanism plate 20, said camera having a focal plane shutter consisting of two, closely parallel, cooperating curtains together providing the exposure aperture, an electric motor supported upon said mechanism plate and having a drive shaft extending therethrough, gearing mounted upon said mechanism plate 20 for causing exposure movement of and for rewinding said curtains, and including means for establishing driving connections between said motor and said shutter when in its run-down condition following exposure, to rewind said shutter, and intermittently acting film feeding mechanism mounted upon said mechanism plate 20 and operatively connected to the shaft of said motor for driving the film feeding mechanism from said motor, said driving connections including stud 187 carried by said mechanism plate 20 and having fast thereon film feed clutch drive gear 189, film feed clutch gear 150, ratchet 194, and gear 150 on said mechanism plate, all in co-axial relation, and film feed gear 67 meshing with gear 150 for driving the film spool of said film feeding mechanism, and also carried by said mechanism plate 20, and bell crank 203 carried by said plate 20 and having a formation to engage said ratchet 194 to hold the latter from rotation, thereby intermitting the film feed, the said motor shaft having thereon a film feed drive gear 143, a cam plate 146, a bell crank 82 operated by said cam plate to control camera functions, and a shaft 72 on the mechanism plate 20 carrying said bell crank 82, the latter having a formation 82a to be engaged by said cam 146 for operating said bell crank.

14. A photographic camera having a casing including as one wall thereof a mechanism plate 20, said camera having a focal plane shutter consisting of two, closely parallel, cooperating curtains together providing the exposure aperture, an electric motor supported upon said mechanism plate and having a drive shaft extending therethrough, gearing mounted upon said mechanism plate 20 for causing exposure movement of and for rewinding said curtains, and including means for establishing driving connections between said motor and said shutter when in its run-down condition following exposure, to rewind said shutter, and intermittently acting film feeding mechanism mounted upon said mechanism plate 20 and operatively connected to the shaft of said motor for driving the film feeding mechanism from said motor, said driving connections including stud 187 carried by said mechanism plate 20 and having fast thereon film feed clutch drive gear 189, film feed clutch gear 190, ratchet 194, and gear 150 on said mechanism plate, all in co-axial relation, and film feed gear 67 meshing with gear 150 for driving the film spool of said film feeding mechanism, and also carried by said mechanism plate 20, and bell crank 203 carried by said plate 20 and having a formation to engage said ratchet 194 to hold the latter from rotation, thereby intermitting the film feed, the said motor shaft having thereon a film feed drive gear 143, a cam plate 146, and a crank arm 147, all in a co-axial relation, the said bell crank 203 having a cam formation 205 to engage a formation on the crank member 147, all in a co-axial relation, said bell crank 82 having an arm 221 and an electric switch 212 operated by said arm 221 for making changes in an electric circuit controlling camera functions.

15. A photographic camera having a casing including as one wall thereof a mechanism plate 20, said camera having a focal plane shutter consisting of two, closely parallel, cooperating curtains together providing the exposure aperture, an electric motor supported upon said mechanism plate and having a drive shaft extending therethrough, gearing mounted upon said mechanism plate 20 for causing exposure movement of and for rewinding said curtains, and including means for establishing driving connections between said motor and said shutter when in its run-down condition following exposure, to rewind said shutter, and intermittently acting film feeding mechanism mounted upon said mechanism plate 20 and operatively connected to the shaft of the motor for driving the film feeding mechanism from said motor, said driving connections including a film measuring roll, a film measuring cam thereon and having notch 208, and bell crank 203 having a finger 207 to engage said notch 208 to hold said film measuring and cam measuring roll from movement, and means to operate said bell crank 203 intermittently.

16. A photographic camera having a casing including as one wall thereof a mechanism plate 20, said camera having a focal plane shutter consisting of two, closely parallel, cooperating curtains together providing the exposure aperture, an electric motor supported upon said mechanism plate and having a drive shaft extending therethrough, gearing mounted upon said mechanism plate 20 for causing exposure movement of and for rewinding said curtains, and including means for establishing driving connections between said motor and said shutter when in its run-down condition following exposure, to rewind said shutter, and intermittently acting film feeding mechanism mounted upon said mechanism plate 20 and operatively connected to the shaft of the motor for driving the film feeding mechanism from said motor, said driving connections including a film measuring roll, a film measuring cam thereon and having notch 208, and bell crank 203 having a finger 207 to engage said notch 208 to hold said film measuring and cam measuring roll from movement, and means to operate said bell crank 203 intermittently, and film drive gear 189 and co-acting clutch members, whereby when said finger 207 does not engage the notch 208 the film clutch drive gear 189 is driven through the said clutch members.

17. A photographic camera having a casing including as one wall thereof a mechanism plate 20, film feed means including gear 67, a stud 185 mounted on said plate 20, and for the purpose of driving said film feed means carrying film clutch drive gear 189, also carrying film feed clutch gear 150, and also carrying interclutch member 192 within said film feed clutch gear 150, a motor on said plate 20 and having a film feed drive gear 143 on its shaft, said gear 150 meshing with film feed drive gear 143, a focal plane curtain shutter, and means for establishing driving connections between said motor and said curtain shutter when the latter is in its run-down condition following exposure to rewind said shutter curtain.

18. A photographic camera having a casing, a focal plane shutter having at least one rewind gear, and film feed mechanism both mounted in said casing, an electric motor built into the camera structure, driving connections from the shaft of said motor to said film feed means, and means for establishing driving connections from the motor to the rewinding gearing of said shutter when the shutter is in its run-down condition following exposure, an electric circuit to said motor and provided with a manually operable controlling switch 281 for commencing a camera cycle, a switch 212 in said circuit for controlling the release of said shutter to make an exposure after closing the switch 281 and for controlling said motor, and means for operating said switch 212 including bell crank 82 and cam plate 146 on the motor shaft for operating said bell crank 82.

19. A combination according to claim 18, but wherein the said switch 212 is provided with contacts 214, 215, 216 so arranged that contacts 215, 216 can be closed, or contacts 214 and 216 can be closed, so as to control the said motor.

20. A photographic camera having a casing, a focal plane curtain shutter having at least one rewind gear, and film feed mechanism both mounted in said casing, an electric motor built into the camera structure, driving connections from the shaft of said motor to said film feed means, and means for establishing driving connections to the rewinding gearing of said curtain shutter, by said shutter reaching its run-down position following exposure in the preceding cycle, an electric circuit to said motor and provided with a manually operable controlling switch 281 for commencing a camera cycle, a switch 225 in said circuit having contacts 226, 227 for completing the circuit to the motor, and means for operating said switch 225 by the said means for establishing connections to said shutter rewind gear of said curtain shutter following exposure, said switch operating means including an operating lever 233, and also including a member moved by the running down movement of the shutter and which, when the shutter reaches substantially its run-down condition, actuates said operating lever 233.

21. A photographic camera provided with a curtain shutter having exposure-movement means and shutter rewind means, film feeding means, a motor with means to start and stop the same, operating connections from said motor to said shutter rewind means, operating connections from said motor to said film feeding means, and means operated directly by the curtain shutter rewind means when and because the shutter is in its run-down condition following exposure, thereby to cause, as a cycle of operations following the exposure operation of the shutter and controlled by the running down operation of the curtain shutter itself, the rewinding of the shutter and the feeding of the film for the next exposure, so as thereby to position the parts at the completion of the said cycle in readiness for the reset cycle.

22. A combination according to claim 21, but wherein the motor is an electric motor and there is a circuit including said motor and having a switch so that upon closing said switch the cycle commences upon the running down of the shutter, and in which combination there is a shutter release lever that is operated after rewinding of the shutter to release the shutter in the next cycle, so that the exposure operation of the shutter commences.

23. A combination according to claim 21, but wherein the motor is an electric motor and there is a circuit including said motor and having a switch, so that upon closing said switch the cycle commences upon the running down of the shutter, and in which combination there is a shutter release lever and a shutter gear held from movement by said shutter release lever until the latter is operated, and in which combination there is an electromagnet energized by the closing of said switch to move said shutter release lever, and thereby permit said gear to rotate, thereby starting the cycle movement upon the running down of the shutter in the preceding cycle.

24. A combination according to claim 21, but wherein the shutter is a two-curtain focal-plane shutter, and wherein there is a shutter release lever and a shutter rewind gear having a formation to engage and be held from movement by said shutter release lever, and wherein there is an operating lever moved by said formation on said shutter rewind gear when permitted by actuation of said shutter release lever, and wherein said motor is started by such movement of said operating lever.

25. A combination according to claim 21, but wherein the motor is an electric motor and wherein the shutter is a two-curtain focal-plane shutter, and wherein there is a shutter release lever and a shutter rewind gear having a formation engaging and to be held from movement by said shutter release lever, and wherein there is an operating lever moved by said formation on said shutter rewind gear when permitted by actuation of said shutter release lever, and wherein there is an electric circuit including said motor and the closing of which circuit actuated said shutter release lever, thereby to cause the movement of said operating lever and consequent starting of said motor.

26. A combination according to claim 18, but wherein the shutter is a two-curtain focal-plane shutter, and wherein there is an operating lever 233 serving both as a switch operating lever and as a shutter run-down stop lever, and wherein there is a second curtain rewind gear 98 having a pin or stud 118 to engage said operating lever 233 when the shutter is released and runs all the way down, and wherein there is a second switch 225 in the electric circuit and having contacts 226, 227, and wherein said contacts are closed, thereby completing the circuit to the motor, by such complete running down of the shutter.

27. A combination according to claim 18, but wherein there is in the electric circuit a solenoid 251 having an armature, and wherein there is a shutter release lever 250 operatively connected to said armature, and wherein the said shutter is a two curtain shutter having a second curtain rewind gear 98 provided with a pin or stud 116, and wherein said shutter release lever 250 is acted upon by said pin 116 when the shutter is run down.

28. A photographic camera in accordance with claim 21 but having a casing including as one wall thereof a mechanism plate 20, said camera having a focal plane shutter consisting of two, closely parallel, cooperating, apertured curtains, which apertures together provide the exposure aperture, said camera having pairs of rollers for said curtains mounted on said plate 20, a bushing 243 upon said plate 20, a shaft 244 in said bushing, a bell crank lever 247 carried by said shaft 244, a shutter release lever 250 also carried by said shaft 244, and a rewind gear for one of said curtains having a pin or stud 116 to be engaged by said shutter release lever.

29. A photographic camera having a focal plane shutter consisting of two closely parallel, first and second, cooperating, apertured curtains, which apertures together constitute the exposure apertures, a tension roller and a take-up roller for each of said curtains, rewind gears 102 and 98 for said first and second curtains respectively, said rewind gear 98 having a stud 116, cooperating film feeding means, and operating means for said film feeding means and said curtains, said means including a shaft 103 having thereon a film rewind clutch member 119, a driving plate 118 and a main shutter rewind gear 117, said camera also having an electric motor to rewind the shutter and operate said film feeding means, and having an electric circuit wherein is said motor, and also having a shutter release lever 250 cooperating with said stud 116, and a solenoid 251 in said circuit to actuate said shuttter release lever.

30. Co-acting shutter and film feeding means in accordance with claim 29, but wherein the said rewind gear 102 is provided with driving studs 110, 111 and 113, and said rewind gear 98 is provided with a driving stud 115 and also with said stud 116.

31. A photographic camera in accordance with claim 21, but the body whereof includes a single mechanism plate 20 for supporting all the operating parts, which latter include said film feeding means, and includes a two-curtain focal-plane shutter, each curtain whereof has a tension roller and a take-up roller, all mounted on said mechanism plate, the said shutter rewind means including rewind gears for each of said curtains, also mounted on said mechanism plate, and gearing for operating said film feed mechanism also mounted on said plate.

32. A combination according to claim 21, but wherein, for operating said film feeding means and said shutter, there is provided an electric motor also mounted on said mechanism plate, and wherein there are driving connections from the shaft of said motor to said film feed mechanism and said shutter also mounted on said mechanism plate, the said parts and said driving connections mounted on said plate including motor shaft 138 and supporting stud shafts 103, 152, 159, 176, 185 and 201, each of said stud shafts carrying one or more of the operating parts for said film feed mechanism and said shutter.

33. A combination according to claim 21, but wherein, for operating said film feeding means and said shutter, there is provided an electric motor also mounted on said mechanism plate, and wherein there are driving connections from the shaft of said motor to said film feed mechanism and said shutter also mounted on said mechanism plate, there being an electric circuit including said motor, switches 212 and 225 and solenoid 251 in said circuit, switch support plates 210 and 223 for said switches, also mounted on said mechanism plate, said solenoid being also mounted on said plate, and a switch operating lever 233 for said switch 225, also mounted on said mechanism plate.

34. A combination according to claim 21, but wherein, for operating said film feeding means and rewinding said shutter, there is provided an electric motor also mounted on said mechanism plate, and wherein there are driving connections from the shaft of said motor to said film feed mechanism and said shutter also mounted on said mechanism plate, the said parts and said driving connections mounted on said plate including motor shaft 138 and supporting stud shafts 103, 152, 159, 176, 185 and 201, each of said stud shafts carrying one or more of the operating parts for said film feed mechanism and said shutter, said stud 159 carrying knob 168 and dial 169 of an exposure counter mechanism, stud 176 carrying an idler gear 184, said stud 103 carrying main shutter rewind gear 117 meshing with said idler gear 184, and said stud 185 carrying film clutch drive gear 189, and interclutch members 192, and a film feed clutch gear outside of said interclutch member 192 and meshing with film feed drive gear 143 on the shaft of said electric motor.

35. A photographic camera in accordance with claim 9, but wherein the said ratchet means controlled by the bell crank 203 includes a ratchet plate 194, and wherein there is a stud 195 carried by said mechanism plate 20 and on which said ratchet plate 194 is axially supported, and wherein there is also carried by said stud 185 a film-clutch drive gear 189 and an overrunning interclutch member 192, and which latter upon its outer surface carries a film-feed clutch gear 150.

36. A photographic camera provided with film feeding means, a shutter and shutter operating means for releasing and rewinding the same, and including an electric circuit having a motor therein and also having contacts and a switch 212 controlling said contacts, a pressure plate or pad adapted to press upon the fed film when the latter is at rest, a shaft 72 whereon said pressure plate is pivotally mounted, a bell crank 82 pivoted upon said shaft 72 and having an arm 221 to engage and operate said switch 212 to control said motor, a cam 146 engaging said bell crank 82, and means to rotate said cam, a pressure pad operating arm 84 fast upon said shaft, said bell crank 82 having an extension 90 engaging and co-acting with said arm 84 in the movement of the parts.

37. A photographic camera having a focal plane shutter consisting of two, closely parallel, cooperating curtains together providing the exposure aperture, an electric motor carried by said camera, means for supporting and for feeding the film, an electric circuit including said motor and also including means to release the shutter so that the shutter may run entirely down, and means for establishing driving connections between the motor and the shutter for rewinding the latter when said shutter is in its run-down condition following the just preceding exposure.

38. A photographic camera having a focal plane shutter consisting of two, closely parallel, cooperating curtains together providing the exposure aperture, an electric motor carried by said camera, means for supporting and for feeding the film and for rewinding the shutter, an electric circuit including said motor and also including means to release the shutter so that the shutter may run entirely down, and means for establishing driving connections between the motor and the shutter for rewinding the latter when said shutter is in its run-down condition following the just preceding exposure and for rotating the motor after stoppage thereof.

39. A combination according to claim 37, but wherein there is a solenoid in said circuit and a switch for energizing said solenoid, and wherein the energization of said solenoid releases the shutter, said means for releasing the shutter including a curtain rewind gear 98 having a pin 116, and wherein there is a shutter release lever 250 moved by the energization of said solenoid and co-acting with said pin 116, and wherein there is an operating lever 233 moved by said pin 116 as positioned by the running down of the curtain, and wherein there is a switch 225 closed by the movement of said operating lever 233 to start the motor.

40. A photographic camera having therein shutter mechanism including a curtain shutter, a release lever for said shutter, an electric circuit including a motor, and including a solenoid to operate said shutter release lever, thereby to permit the shutter to run down, and also including a switch to start said motor, and means operated by the shutter mechanism when the shutter reaches its run-down condition, to close the said switch, thereby to start the motor for the next cycle, and film feed means driven by said motor.

41. A photographic camera having therein shutter mechanism including a curtain shutter, a release lever for said shutter, an electric circuit including a motor, and including a solenoid to operate said shutter release lever, thereby to permit the shutter to run down, and also including a switch to start said motor, and means operated by the shutter mechanism when the shutter reaches its run-down condition, to close the said switch, thereby to start the motor for the next cycle, film feed means driven by said motor, and shutter rewinding means under the control of said motor, the said construction and the said relation of the said parts therefore being such that the running down of the shutter initiates a new cycle wherein the film is automatically fed for the exposure in said new cycle, and the shutter is rewound for such exposure in said new cycle.

42. In a combined film feeding means and shutter movement for photographic cameras, a curtain shutter supported by the camera body and having shutter release means, and shutter rewinding means, film feeding means, an electric circuit including an electric motor and also including electromagnetic means to operate the said shutter release means, a switch governing said circuit, gearing connecting said motor to said film feeding means to feed a new area of film following exposure, and means operatively connecting said motor to said shutter rewinding means and established only by the run-down shutter, to initiate a new cycle immediately following the exposure movement of the shutter, thereby to start the motor for such new cycle by feeding said new area of film and rewinding the shutter so as to rewind the shutter upon completion of the said feeding of the next area of film, thereby rendering the camera ready (because of said feeding of a new film area and the rewinding of the shutter) to make an exposure instantly upon the closing of the circuit to the said electromagnetic means for operating the said shutter release means.

43. A combination according to claim 42, but wherein the shutter is a focal plane shutter, and wherein said circuit is provided with a switch to control the starting and stopping of said motor, and wherein said switch is closed by the shutter mechanism when and because the shutter is run down, whereby then automatically follows as a cycle the feeding of the next area of film and the rewinding of the shutter.

44. A photographic camera having shutter mechanism including a focal plane shutter consisting of two closely parallel, cooperating, apertured curtains, said apertures together providing the exposure aperture, a motor, starting and stopping means therefor, and means for establishing driving connections between said motor and said shutter when the shutter is in its run-down condition following exposure in the preceding cycle, to rewind the curtains constituting said shutter for the next cycle, whereby rewinding of the curtains constituting said shutter is controlled by said motor and said motor is started for said next cycle by, said driving connections when in the run-down condition of the said shutter.

45. A photographic camera in accordance with claim 36, but wherein the said bell crank 82 is provided with an extension 239, and wherein there is a counter dial 169 and ratchet-like means 170 co-axial therewith for rotating said counter dial, and wherein the said extension 239 of the bell crank 82 engages said ratchet-like means 170, and in each movement of said bell crank 82 imparts a single film-exposure counting movement to said counter dial.

46. A combination according to claim 36, but wherein the camera casing includes as one wall thereof a mechanism plate 20, having thereon a stud carrying a knob 168, and wherein a counter dial 169 and a gear 167 are mounted for turning movement on said stud, and wherein there is also a stud 152 on said mechanism plate 20 carrying a gear 157 meshing with said gear 167, and wherein the said bell crank 82 is provided with an extension 239 to impart film-exposure counting movement to said counter dial 169 in accordance with the film feeding movements.

EDSON S. HINELINE.